US009510161B2

(12) United States Patent
Yeh et al.

(10) Patent No.: US 9,510,161 B2
(45) Date of Patent: Nov. 29, 2016

(54) METHOD FOR PUBLIC SAFETY COMMUNICATION AND APPARATUS FOR THE SAME

(71) Applicant: Electronics & Telecommunications Research Institute, Daejeon (KR)

(72) Inventors: Choong Il Yeh, Daejeon (KR); Jae Young Ahn, Daejeon (KR); Tae Gyun Noh, Daejeon (KR); Dong Hyun Ahn, Daejeon (KR)

(73) Assignee: ELECTRONICS & TELECOOMUNICATIONS RESEARCH INSTITUTE, Daejeon (KR)

( * ) Notice: Subject to any disclaimer, the term of this patent is extended or adjusted under 35 U.S.C. 154(b) by 50 days.

(21) Appl. No.: 14/324,502

(22) Filed: Jul. 7, 2014

(65) Prior Publication Data

US 2015/0009881 A1    Jan. 8, 2015

(30) Foreign Application Priority Data

| Jul. 8, 2013 | (KR) | ........................ 10-2013-0079683 |
| Jul. 15, 2013 | (KR) | ........................ 10-2013-0082586 |
| Aug. 28, 2013 | (KR) | ........................ 10-2013-0102503 |
| Sep. 9, 2013 | (KR) | ........................ 10-2013-0107964 |
| Jan. 29, 2014 | (KR) | ........................ 10-2014-0010986 |
| Jul. 7, 2014 | (KR) | ........................ 10-2014-0084555 |

(51) Int. Cl.
*H04W 4/08* (2009.01)
*H04W 72/00* (2009.01)
*H04W 4/06* (2009.01)
*H04W 4/00* (2009.01)
*H04W 4/22* (2009.01)

(52) U.S. Cl.
CPC ................ *H04W 4/08* (2013.01); *H04W 4/06* (2013.01); *H04W 72/005* (2013.01); *H04W 4/005* (2013.01); *H04W 4/22* (2013.01)

(58) Field of Classification Search
CPC ........................................................ H04W 4/08
See application file for complete search history.

(56) References Cited

U.S. PATENT DOCUMENTS

| 7,548,758 B2 * | 6/2009 | Periyalwar | .......... H04W 52/383 370/324 |
| 8,577,404 B2 | 11/2013 | Brewer et al. | |
| 2003/0109216 A1 * | 6/2003 | Kim | .................... H04W 76/002 455/3.01 |
| 2008/0080628 A1 * | 4/2008 | To | ........................ H04L 5/0044 375/260 |
| 2010/0150091 A1 * | 6/2010 | Yu | ...................... H04W 72/042 370/329 |
| 2010/0329216 A1 * | 12/2010 | Jen | ...................... H04B 7/2606 370/332 |

(Continued)

*Primary Examiner* — Brian D Nguyen
*Assistant Examiner* — Toan Nguyen
(74) *Attorney, Agent, or Firm* — NSIP Law

(57) ABSTRACT

Disclosed are methods and apparatuses for public safety communication. A method comprises transmitting a groupcast setup request message to a base station; receiving an uplink grant message including information on groupcast resources in response to the groupcast setup request message from the base station; and transmitting data to be transmitted to receiving terminals belonging to a group to which the transmitting terminal belongs to the base station through the groupcast resources. Therefore, public safety communication can be efficiently performed in a wireless communication system.

6 Claims, 18 Drawing Sheets

FIG. 2

(56) References Cited

U.S. PATENT DOCUMENTS

| | | | |
|---|---|---|---|
| 2011/0077038 A1* | 3/2011 | Montojo | H04B 7/024 455/507 |
| 2011/0141963 A1* | 6/2011 | Lim | H04H 20/67 370/312 |
| 2012/0163316 A1 | 6/2012 | Kim et al. | |
| 2012/0258706 A1* | 10/2012 | Yu | H04W 56/0045 455/426.1 |
| 2012/0320776 A1* | 12/2012 | Lim | H04W 76/023 370/252 |
| 2013/0028151 A1* | 1/2013 | Ning | H04B 7/2643 370/280 |
| 2013/0064166 A1* | 3/2013 | Calcev | H04W 4/08 370/312 |
| 2013/0336307 A1* | 12/2013 | Park | H04W 56/00 370/350 |
| 2014/0003320 A1* | 1/2014 | Etemad | H04W 4/06 370/312 |
| 2014/0010172 A1* | 1/2014 | Wei | H04W 76/023 370/329 |

* cited by examiner

☒: RTS  ☒: CTS  ☒: DATA  ☒: ACK

☒: L-REQ  ☒: L-RLY  ☒: DATA  ☒: ACK

METHOD FOR PUBLIC SAFETY COMMUNICATION AND APPARATUS FOR THE SAME

CLAIM FOR PRIORITY

This application claims priorities to Korean Patent Application No. 10-2013-0079683 filed on Jul. 8, 2013, No. 10-2013-0082586 filed on Jul. 15, 2013, No. 10-2013-0102503 filed on Aug. 28, 2013, No. 10-2013-0107964 filed on Sep. 9, 2013, No. 10-2014-0010986 filed on Jan. 29, 2014, and No. 10-2014-0084555 filed on Jul. 7, 2014 in the Korean Intellectual Property Office (KIPO), the entire contents of which are hereby incorporated by references.

BACKGROUND

1. Technical Field

Example embodiments of the present invention relate to a wireless communication technology and more specifically to a method for public safety communication in a wireless communication system and an apparatus for the same.

2. Related Art

In a cellular communication environment, a general method for exchanging data between terminals is a communication method via a base station. That is, if a first terminal has data to be transmitted to a second terminal, the first terminal transmits the data to a first base station to which it belongs. Then, the first base station transmits the data received from the first terminal to a second base station to which the second terminal belongs through a core network. At last, the second base station transmits the data received from the first base station to the second terminal. Here, the first base station and the second base station may be same, or may be different.

On the other hand, a device-to-device (D2D) communication may refer to a communication method in which terminals communicate with each other without a base station. For example, when a terminal is in a radio shadow area or an adjacent base station is broken temporarily, since the terminal cannot receive a signal from the base station, the terminal may communicate with another terminal in a D2D communication manner.

A public safety communication may be introduced into such the wireless communication system. The public safety communication may be used for supporting a prediction of a disastrous situation, transmission of information in a disaster scene, disaster correspondence, etc. The public safety communication may be performed in an unicast manner, a groupcast manner, and a broadcast manner. Also, the public safety communication may be classified into a public safety communication in an environment where a base station exists and a public safety communication in an environment where a base station does not exist (for example, a base station is broken temporarily or a terminal is in a radio shadow area).

Currently, a groupcast based or broadcast based public safety communication in the environment where a base station exists is not clearly defined. Also, a unicast based, groupcast based, or broadcast based public safety communication in the environment where a base station does not exist is not clearly defined.

SUMMARY

Accordingly, example embodiments of the present invention are provided to substantially obviate one or more problems due to limitations and disadvantages of the related art.

Example embodiments of the present invention provide a method for efficiently performing public safety communications in a wireless communication system.

Example embodiments of the present invention also provide an apparatus for efficiently performing public safety communications in a wireless communication system.

In some example embodiments, a public safety communication method performed in a transmitting terminal, the method comprises transmitting a groupcast setup request message to a base station; receiving an uplink grant message including information on groupcast resources in response to the groupcast setup request message from the base station; and transmitting data to be transmitted to receiving terminals belonging to a group to which the transmitting terminal belongs to the base station through the groupcast resources.

Here, the method further comprises when the transmitting terminal does not have data to be transmitted to the receiving terminals belonging to the group to which the transmitting to terminal belongs, transmitting a groupcast end request message to the base station; and receiving a groupcast end notification message in response to the groupcast end request message from the base station.

Here, the method further comprises when the transmitting terminal receives a groupcast interrupt request message from the base station during data transmission, stopping the data transmission; and when the transmitting terminal receives an uplink regnant message from the base station, resuming the stopped data transmission.

Here, the groupcast setup request message is transmitted through a physical uplink shared channel (PUSCH).

Here, the uplink grant message is received through a physical downlink control channel (PDCCH).

Here, the uplink grant message is scrambled using an identifier of the group to which the transmitting terminal belongs.

In some example embodiments, a public safety communication method performed in a transmitting node supporting groupcast or broadcast, the method comprises a frame used in the method includes a plurality of data channels, a plurality of ACK channels corresponding the plurality of data channels, a plurality of L-REQ channels corresponding the plurality of data channels, and a plurality of L-RLY channels corresponding the plurality of data channels, transmitting a $k^{th}$ L-REQ channel including a groupcast or a broadcast identifier (ID) to support groupcast or broadcast link setup, wherein k is a natural number; and receiving a null message from a receiving node through a L-RLY channel corresponding the $k^{th}$ L-REQ channel if the groupcast or broadcast link setup is allowed, or a predefined sequence message from the receiving node through the L-RLY channel corresponding the $k^{th}$ L-REQ channel if the groupcast or broadcast link setup is not allowed.

Here, the method further comprises performing the groupcast from a next frame if the null message is received from the receiving node, or re-performing the groupcast link setup in the next frame if the predefined sequence message is received from the receiving node.

Here, when the groupcast is performed by setting the groupcast link, a predefined signal to protect the groupcast link is transmitted from the receiving node through an ACK channel.

In some example embodiments, a priority call process method comprises a frame used in the method includes a plurality of data channels, a plurality of ACK channels corresponding the plurality of data channels, a plurality of L-REQ channels corresponding the plurality of data channels, and a plurality of L-RLY channels corresponding the plurality of data channels, requesting, by a node having a priority call to be transmitted, priority call link setup using a specified data channel through a L-REQ channel in a $n^{th}$ frame, wherein n is a nature number; transmitting, by a node having usage right of the specified data channel, information indicating transmission suspension through the specified data channel in a $(n+1)^{th}$ frame; and transmitting, by a node receiving the information indicating transmission suspension, information indicating that the transmission suspension is recognized through an ACK channel corresponding the specified data channel.

In some example embodiments, a priority call process method comprises a frame used in the method includes a plurality of data channels, a plurality of ACK channels corresponding the plurality of data channels, a plurality of L-REQ channels corresponding the plurality of data channels, and a plurality of L-RLY channels corresponding the plurality of data channels, requesting, by a node having a priority call to be transmitted, priority call link setup using a specified data channel through a L-REQ channel in a $n^{th}$ frame, wherein n is a nature number; requesting, by a node receiving the specified data channel, usage suspension of the specified data channel through a ACK channel corresponding the specified data channel in a $(n+1)^{th}$ frame; and suspending, by a node having a usage right of the specified data channel, usage of the specified data channel from a $(n+2)^{th}$ frame if request of usage suspension of the specified data channel is allowed.

In some example embodiments a public safety communication method performed in a transmitting node, the method comprises a frame used in the method includes a plurality of broadcast channels (BCH), a plurality of BCH occupancy indication (bcoi) channels and a plurality of echo channels which are used for confirming occupancy status of the BCH, transmitting a predefined orthogonal code through a bcoi channel in a $n^{th}$ frame to notifying that a BCH in a $(n+1)^{th}$ frame is occupied by the transmitting node, wherein n is a nature number; receiving, by the transmitting node, information including at least one orthogonal code through an echo channel in the $n^{th}$ frame, wherein the information including at least one orthogonal code, transmitted through a bcoi channel in $n^{th}$ frame, is obtained by a receiving node; and transmitting a data through a BCH in the $(n+1)^{th}$ frame if the predefined orthogonal code transmitted from the transmitting node is only included in the information including at least one orthogonal code, or a data through a BCH in the $(n+1)^{th}$ frame if the predefined orthogonal code transmitted from the transmitting node is conformed to a predefined condition when the information including at least one orthogonal code includes a plurality of orthogonal code.

In some example embodiments, a frame used in public safety communication method comprises a domain in which a data is transmitted; and a domain in which a synchronization signal is transmitted, a gap is configured between each of transmission domains to guarantee a changeover time between transmission and reception.

In some example embodiments, a public safety communication method performed in a node, the method comprises monitoring a synchronization reference signal during a predefined period to obtain synchronization; and obtaining the synchronization based on detected synchronization reference signal if the synchronization reference signal is detected during the predefined period, or performing functions of synchronization source if the synchronization reference signal is not detected during the predefined period.

According to the present invention, public safety communication can be efficiently performed in a wireless communication system.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
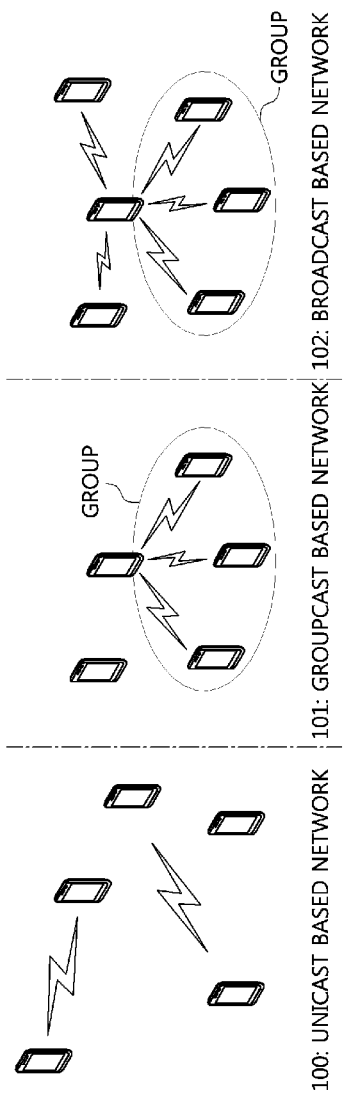
FIG. 1 is a conceptual diagram illustrating manners in which the public safety communication is performed.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The term "network" or "communication network" used in this specification may include a mobile internet such as a Wireless Fidelity (WIFI), a Wireless Broadband Internet (WiBro), and a World Interoperability for Microwave Access (WiMax). Also, it may include 2G cellular networks such as a Global System for Mobile communication (GSM) and a Code Division Multiple Access (CDMA), 3G cellular networks such as a Wideband Code Division Multiple Access (WCDMA) and a CDMA2000. Also, it may include 3.5G cellular network such as a High Speed Downlink Packet Access (HSDPA) and a High Speed Uplink Packet Access (HSUPA). Also, it may include 4G or beyond 4G cellular network such as a Long Term Evolution (LTE) and a LTE-Advanced. Also, it may include 5G cellular network.

A "terminal" used in this disclosure may refer to user equipment (UE), a mobile station (MS), a user terminal (UT), a wireless terminal, an access terminal (AT), a terminal, a subscriber unit, a subscriber station (SS), a wireless device, a wireless communication device, a wireless transmit/receive unit (WTRU), a mobile node, a mobile, etc. Various examples of the terminal may include a cellular phone, a smartphone having a wireless communication function, a personal digital assistant (PDA) having a wireless communication function, a wireless modem, a portable computer having a wireless communication function, a photographing device such as a digital cameras having a wireless communication function, a gaming device having a wireless communication function, a music storage and reproduction home appliance have a wireless communication function, an Internet home appliance capable of wireless Internet access and browsing, and a portable unit or a terminal having a combination of such functions.

A "base station" used in this disclosure generally refers to a fixed or mobile point that communicates with a terminal and may be a term for collectively referring to an access point, a radio access station, Node-B, eNode-B, a base transceiver station, a mobile multihop relay-base station (MMR-BS), etc. Also, the "base station" may include entire or some features of the access point, the radio access station, Node-B, eNode-B, the base transceiver station, the MMR-BS, etc.

Also, the base station may mean a control apparatus to control single cell. Physical base station may control a plurality of cells in communication system, in that case, the physical base station may include a plurality of control apparatuses. Each of the plurality of control apparatuses may allocate different parameters each other.

The public safety communication has been introduced into the Long Term Evolution (LTE), the Institute of Electrical and Electronics Engineers (IEEE) 802.16, etc. Generally, the public safety communication may be classified into a unicast based public safety communication, a groupcast based public safety communication, and a broadcast based public safety communication.

FIG. 1 is a conceptual diagram illustrating manners in which the public safety communication is performed.

Referring to FIG. 1, each terminal may perform the public safety communications with a single terminal in a unicast based network 100. Also, each terminal may perform the public safety communications with terminals belonging to a same group in a groupcast based network 101. Also, each terminal may perform the public safety communications with all terminals in a broadcast based network 102.

The public safety communication is performed in coverage (in network) of a cell of a base station, or the public safety communication may be performed out of coverage (out of network) of the cell of the base station.

Figure 2:
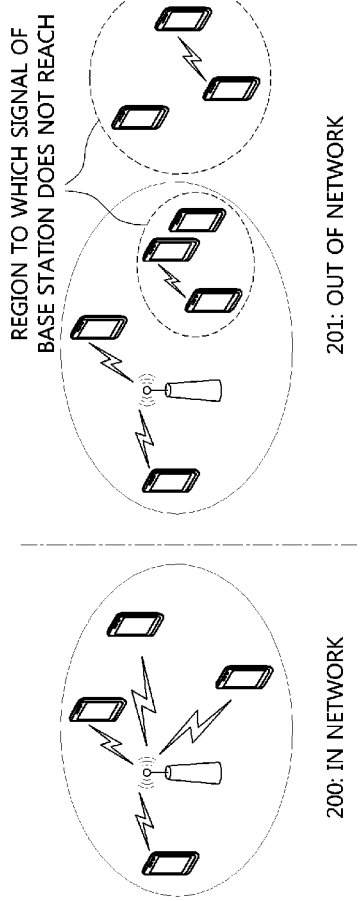
FIG. 2 is a conceptual diagram illustrating a network environment in which the public safety communication is performed.

FIG. 2 is a conceptual diagram illustrating a network environment in which the public safety communication is performed.

Referring to FIG. 2, in a network environment 200 within a cell coverage of a base station, the base station may support the public safety communication by performing synchronization signal transmission, resource allocation, control information transmission, etc. Meanwhile, a network environment 201 out of a cell coverage of a base station may mean cases where the base station is temporarily broken or signals of the base station cannot reach terminals. In these cases, the base station cannot support the public safety communication.

The conventional LTE specification does not define the unicast based public safety communication, the group cast based public safety communication, the broadcast based public safety communication. Thus, methods for public safety communication should be defined as shown in a below table 1.

TABLE 1

|  | Unicast | Groupcast | Broadcast |
|---|---|---|---|
| In coverage | Using conventional LTE standard (via a base station) | New specification needed | New specification needed |
| Out of coverage | New specification needed | New specification needed | New specification needed |

Hereinafter, a groupcast (or, broadcast) based public safety communication method for the in-coverage network environment will be explained in detail. In the in-coverage network environment, there may be two groupcast based public safety communication methods. A first one is a method that a transmitting terminal transmits information (that is, public safety information) to terminals belonging to a specific group via a base station. Also, a second one is a method that a base station allocates resources for the groupcast to terminals belonging to a specific group via a control channel, and then a transmitting terminal belonging to the specific group groupcasts the information (that is, public safety information) to receiving terminals belonging to the specific group by using the resources allocated for the groupcast.

Figure 3:
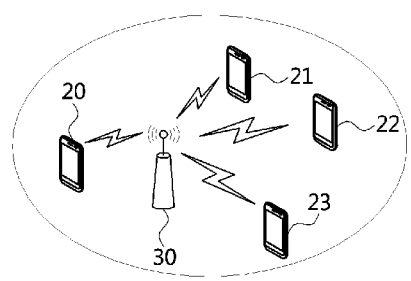
FIG. 3 is a conceptual diagram illustrating an example embodiment of a groupcast based public safety communication method in the in-coverage network environment.

FIG. 3 is a conceptual diagram illustrating an example embodiment of a groupcast based public safety communication method in the in-coverage network environment.

Referring to FIG. 3, a transmitting terminal 20 belonging to a specific group may transmit information to a base station 30, and then the base station 30 may perform a role of a relay apparatus transmitting the information received from the transmitting terminal 20 to receiving terminals 21, 22, and 23 belonging to the specific group.

Figure 4:
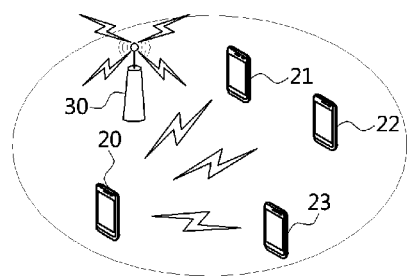
FIG. 4 is a conceptual diagram illustrating another example embodiment of a groupcast based public safety communication method in the in-coverage network environment.

FIG. 4 is a conceptual diagram illustrating another example embodiment of a groupcast based public safety communication method in the in-coverage network environment.

Referring to FIG. 4, a base station 30 may allocate groupcast resources and transmit control information including the allocated resources via a control channel (for example, a physical downlink control channel (PDCCH) of the LTE) to terminals belonging to a specific group. The terminals 20, 21, 22, and 23 belonging to the specific group may receive the control information about the allocated resources from the base station 30. The transmitting terminal 20 belonging to the specific group may transmit the public safety information to the terminals 21, 22, and 23 belonging to the specific group by using the allocated groupcast resources without intervention of the base station. Then, the terminals 21, 22, and 23 may receive the public safety information transmitted through the allocated groupcast resources.

A hop gain is one of the most important advantages which can be achieved by a device-to-device (D2D) communication. Although both uplink and downlink are needed for the public safety communication in the communications manners illustrated in FIG. 3, only one link can be used for the public safety communication in a communication manner illustrated in FIG. 4. That is, even though a hop gain is one of important advantages in the unicast based communication, a hop gain can be ignored in the groupcast (or, broadcast) based communication.

Then, a radio network temporary identifier (RNTI) which is used for the public safety communication according to the present invention will be explained in detail. In the LTE standard, multiple downlink control information (DCI) can be transmitted by a base station as multiplexed in the PDCCH. The DCI may include resource allocation information and control information. The unit of time-frequency resources constituting the PDCCH may be defined as control channel element (CCE). In order for a terminal to receive a DCI for it, the terminal does not have to perform decoding on all CCEs. A set of CCE on which the terminal should perform decoding to receive the resource allocation information and the control information may be defined as a search space. The location information on CCEs for each terminal may not be explicitly transmitted to each terminal. That is, the terminal may identify its search space by using its RNTI and a current subframe number. Also, the base station may scramble the DCI by using a RNTI of the terminal for information security.

In order to support the groupcast (or, broadcast) based public safety communication, an RNTI for the public safety communication should be defined. That is, since many persons (terminals) belonging to various groups such as police officers and firefighters work in a disaster scene, various types of groupcast (or, broadcast) RNTIs should be defined.

The below table 2 represents RNTIs defined in the LTE standard.

TABLE 2

| Value | RNTIs |
|---|---|
| 0000 | N/A |
| 0001-003C | RA-RNTI, C-RNTI, SPS C-RNTI, TC-RNTI, TPC-PUCCH-RNTI, TPC-PUSCH-RNTI |
| 003D-FFF3 | C-RNTI, SPS C-RNTI, TC-RNTI, TPC-PUCCH-RNTI, TPC-PUSCH-RNTI |
| FFF4-FFFC | Reserved |
| FFFD | M-RNTI |
| FFFE | P-RNTI |
| FFFF | SI-RNTI |

As shown in the table 2, since various types of RNTIs are already defined in the LTE standard, it is not so easy to newly define an RNTI for the groupcast (or, broadcast). In order to resolve the above problem, an RNTI for groupcast (or, broadcast) may be defined as follows.

CG(common groupcast)-RNTI
PG(private groupcast)-RNTI
B(broadcast)-RNTI

A terminal may have a PG-RNTI determined according to its group and a CG-RNTI independent from its group. The CG-RNTI may be used for identifying a search space of the terminal. That is, the base station allocates resources for the groupcast via a PDCCH, and then the terminal may identify a position of CCE for it by using its CG-RNTI. Also, the PG-RNTI may be used for scrambling a DCI. The terminal can successfully decode DCI for it by using its PG-RNTI when a current transmission is a groupcast transmission for a group to which the terminal belongs. On the contrary, the terminal cannot decode DCI when a current transmission is a groupcast transmission which is not related to a group to which the terminal belongs.

Meanwhile, the base station may indicate a search space and scramble a corresponding DCI by using a B-RNTI when a current transmission is a broadcast transmission. Alternatively, the base station may not scramble the DCI for broadcast according to a property of a current service.

Figure 5:
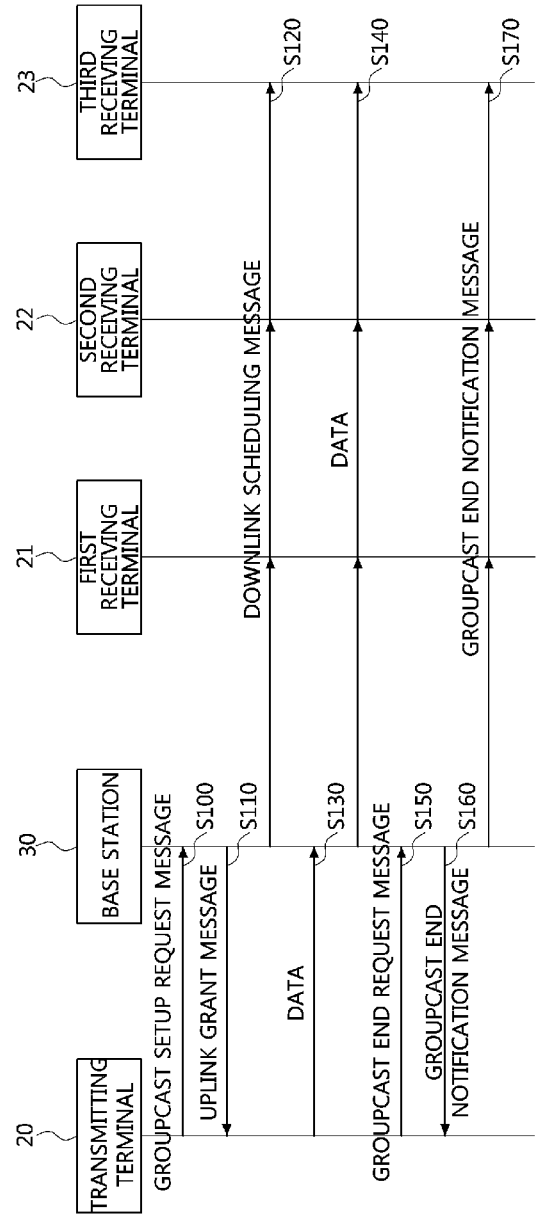
FIG. 5 is a flow chart illustrating a groupcast based public safety communication method according to an example embodiment of the present invention.

FIG. 5 is a flow chart illustrating a groupcast based public safety communication method according to an example embodiment of the present invention.

Referring to FIG. 5, a transmitting terminal 20 and receiving terminals 21, 22, and 23 may mean terminals belonging to a same group. The transmitting terminal 20 may mean a terminal which wants to transmit public safety information. The transmitting terminal 20 may transmit a groupcast setup request message to a base station 30 via a physical uplink shared channel (PUSCH) (S100).

When the base station 30 which receives the groupcast setup request message confirms transmission of the public safety information, the base station 30 may transmit an uplink grant message to the transmitting terminal 20 through PDCCH by using a C-RNTI (or, CG-RNTI or PG-RNTI) (S110). Also, the base station 30 may allocate downlink resources to the receiving terminals 21, 22, and 23 by using CG-RNTI/PG-RNTI (S120). That is, the base station 30 may transmit a downlink scheduling message to the receiving terminals 21, 22, and 23 through PDCCH.

The transmitting terminal 20 may transmit the public safety information to the receiving terminals 21, 22, and 23 via the base station. That is, the transmitting terminal 20 may transmit the public safety information to the base station 30 through PUSCH (S130), and the base station 30 may transmit the information received from the transmitting terminal 20 to the receiving terminals 21, 22, and 23 through a physical downlink shared channel (PDSCH) (S140).

If the transmitting terminal 20 does not have information to transmit to the receiving terminal 21, 22, and 23 (that is, when the transmitting terminal 20 completes transmission of the public safety information), the transmitting terminal 20 may transmit a groupcast end request message to the base station 30 through PUSCH (S150). When the base station 30 receives the groupcast end request message from the transmitting terminal 20, it may transmit a groupcast end notification message to the transmitting terminal 20 through PDCCH by using a C-RNTI (or, CG-RNTI or PG-RNTI) so as to notify the end of the groupcast transmission (S160). Also, the base station 30 may transmit a groupcast end notification message to the receiving terminals 21, 22, and 23 through PDCCH by using CG-RNTI/PG-RNTI so as to notify the end of the groupcast transmission (S170).

On the other hand, while performing the above-described groupcast based public safety communication method, a transmission request of other terminal belonging to the same group may occur. Since two or more simultaneous transmissions in a single group are not permitted in the groupcast based public safety communication, the following procedure may be performed.

Figure 6:
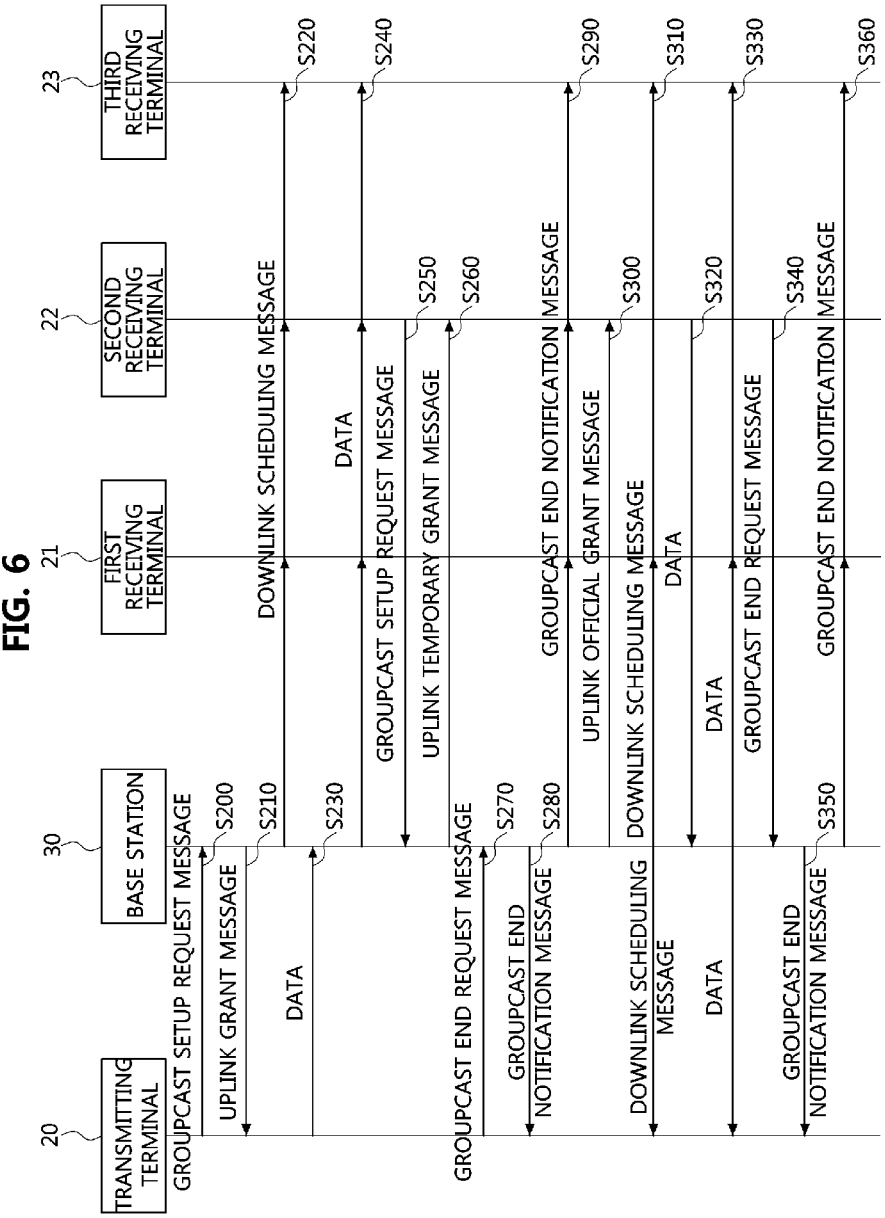
FIG. 6 is a flow chart illustrating a groupcast based public safety communication method according to other example embodiment of the present invention.

FIG. 6 is a flow chart illustrating a groupcast based public safety communication method according to other example embodiment of the present invention.

Referring to FIG. 6, a transmitting terminal 20 and receiving terminals 21, 22, and 23 may mean terminals belonging to a same group. The transmitting terminal 20 may mean a terminal which wants to transmit public safety information. The transmitting terminal 20 may transmit a groupcast setup request message to a base station 30 via a physical uplink shared channel (PUSCH) (S210). When the base station 30 which receives the groupcast setup request message confirms transmission of the public safety information, the base station 30 may transmit an uplink grant message to the transmitting terminal 20 through PDCCH by using a C-RNTI (or, CG-RNTI or PG-RNTI) (S210). Also, the base station 30 may allocate downlink resources to the receiving terminals 21, 22, and 23 by using CG-RNTI/PG-RNTI (S220). That is, the base station 30 may transmit a downlink scheduling message to the receiving terminals 21, 22, and 23 through PDCCH.

The transmitting terminal 20 may transmit the public safety information to the receiving terminals 21, 22, and 23 via the base station 30. That is, the transmitting terminal 20 may transmit the public safety information to the base station 30 through PUSCH (S230), and the base station 30 may transmit the information received from the transmitting terminal 20 to the receiving terminals 21, 22, and 23 through a physical downlink shared channel (PDSCH) (S240).

Meanwhile, while the groupcast based public safety communications between the transmitting terminal 20 and the receiving terminals 21, 22, and 23 is being performed, a second receiving terminal 22 may also transmit a groupcast setup request message to the base station 30 through PUSCH (S250).

The base station 30 which receives the groupcast setup request message from the second receiving terminal 22 may transmit an uplink temporary grant message to the second receiving terminal 22 through PDCCH by using a C-RNTI (or, CG-RNTI or PG-RNTI) (S260). Here, the uplink temporary grant message may indicate that the groupcast setup request of the second receiving terminal 22 is in a wait state. That is, the second receiving terminal 22 which receives the uplink temporary grant message may not transmit the public safety information until an uplink official grant message is received from the base station 30.

If the transmitting terminal 20 does not have information to transmit to the receiving terminal 21, 22, and 23 (that is, if the transmitting terminal 20 completes transmission of the public safety information), the transmitting terminal 20 may transmit a groupcast end request message to the base station 30 through PUSCH (S270). When the base station receives the groupcast end request message from the transmitting terminal 20, it may transmit a groupcast end notification message to the transmitting terminal 20 through PDCCH by using a C-RNTI (or, CG-RNTI or PG-RNTI) so as to notify the end of the groupcast transmission (S280). Also, the base station 30 may transmit a groupcast end notification message to the receiving terminals 21, 22, and 23 through PDCCH by using CG-RNTI/PG-RNTI so as to notify the end of the groupcast transmission (S290).

When the groupcast based public safety communication procedures between the transmitting terminal 20 and the receiving terminals 21, 22, and 23 is completed, if the base station 30 confirms transmission of the public safety information, it may transmit an uplink official grant message to the second receiving terminal 22 through PDCCH by using a C-RNTI (or, CG-RNTI or PG-RNTI) (S300). Also, the base station 30 may allocate downlink resources to the terminals 20, 21, and 23 by using CG-RNTI/PG-RNTI (S310). That is, the base station 30 may transmit a downlink scheduling message to the terminals 20, 21, and 23 through PDCCH.

The second receiving terminal 22 may transmit the public safety information to the terminals 20, 21, and 23 via the base station 30. That is, the second receiving terminal 22 may transmit the public safety information to the base station 30 through PUSCH (S320), and the base station 30 may transmit the information received from the second receiving terminal 22 to the terminals 20, 21, and 23 through PDSCH (S330).

If the second receiving terminal 22 does not have information to transmit to the terminals 20, 21, and 23 (that is, if the terminal 22 completes transmission of the public safety information), the second receiving terminal 22 may transmit a groupcast end request message to the base station 30 through PUSCH (S340). When the base station 30 receives the groupcast end request message from the terminal 22, it may transmit a groupcast end notification message to the terminal 22 through PDCCH by using a C-RNTI (or, CG-RNTI or PG-RNTI) so as to notify the end of the groupcast transmission (S350). Also, the base station 30 may transmit a groupcast end notification message to the terminals 20, 21, and 23 through PDCCH by using CG-RNTI/PG-RNTI so as to notify the end of the groupcast transmission (S360).

Meanwhile, the base station may recover resources allocated during the groupcast based public safety communication. Specifically, the base station may notify a transmitting terminal and a receiving terminal that allocated resources are recovered by transmitting a resource recovery message including a DCI scrambled by CG-RNTI/PG-RNTI to the transmitting terminal and the receiving terminal. When the resource recovery message is received, the transmitting terminal may stop transmitting the public safety information until resources are newly allocated from the base station. Also, the receiving terminal may also stop receiving the public safety information until resources are newly allocated from the base station. Then, the base station may re-allocate resources to the transmitting terminal and the receiving terminal by transmitting an uplink grant message to the transmitting terminal and transmitting a downlink scheduling message to the receiving terminal. The transmitting terminal may transmit the public safety information to the base station through the reallocated resources, and the receiving terminal may receive the public safety information from the base station through the reallocated resources.

On the other hand, while performing the above-described groupcast based public safety communication method, a transmission request corresponding to a high priority traffic may be generated by other terminal belonging to the same group. Since two or more simultaneous transmissions in a single group are not permitted in the groupcast based public safety communication, the following procedure may be performed.

Figure 7:
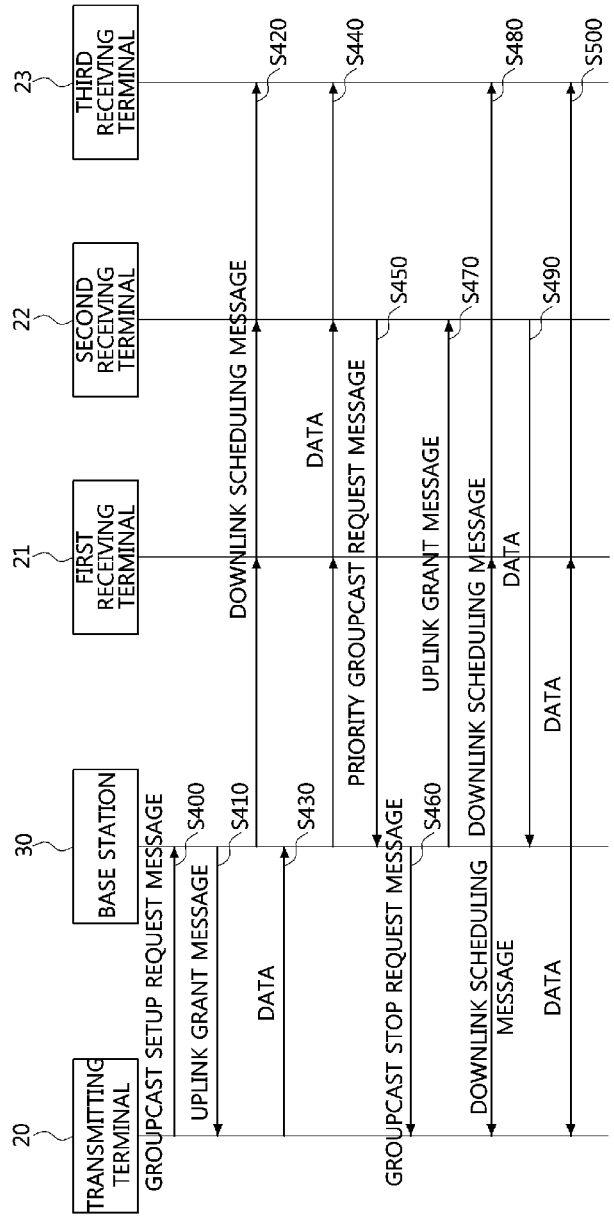
FIG. 7 is a flow chart illustrating a groupcast based public safety communication method according to still other example embodiment of the present invention.

FIG. 7 is a flow chart illustrating a groupcast based public safety communication method according to still other example embodiment of the present invention.

Referring to FIG. 7, a transmitting terminal 20 and receiving terminals 21, 22, and 23 may mean terminals belonging to a same group. The transmitting terminal 20 may mean a terminal which wants to transmit public safety information. The transmitting terminal 20 may transmit a groupcast setup request message to a base station 30 via PUSCH (S400). When the base station 30 which receives the groupcast setup request message confirms transmission of the public safety information, the base station 30 may transmit an uplink grant message to the transmitting terminal 20 through PDCCH by using a C-RNTI (or, CG-RNTI or PG-RNTI) (S410). Also, the base station 30 may allocate downlink resources to the receiving terminals 21, 22, and 23 by using CG-RNTI/PG-RNTI (S420). That is, the base station 30 may transmit a downlink scheduling message to the receiving terminals 21, 22, and 23 through PDCCH.

The transmitting terminal 20 may transmit the public safety information to the receiving terminals 21, 22, and 23 via the base station 30. That is, the transmitting terminal 20 may transmit the public safety information to the base station 30 through PUSCH (S430), and the base station 30 may transmit the information received from the transmitting terminal 20 to the receiving terminals 21, 22, and 23 through a physical downlink shared channel (PDSCH) (S440).

Meanwhile, while the groupcast based public safety communications between the transmitting terminal 20 and the receiving terminals 21, 22, and 23 is being performed, if a second receiving terminal 22 has a high priority traffic to be transmitted, the second receiving terminal 22 may transmit a priority groupcast request message to the base station 30 through PUSCH (S450). In this case, the second receiving terminal 22 may transmit the priority groupcast request message to the base station 30 through PUSCH or PUCCH.

When the base station 30 receives the priority groupcast request message, it may transmit a groupcast interrupt request message to the transmitting terminal 20 (S460). Here, the groupcast interrupt request message may have a DCI format. If the transmitting terminal 20 receives the groupcast interrupt request message, it may stop transmitting public safety information.

Then, the base station 30 may transmit an uplink grant message to the second receiving terminal 22 through PDCCH by using a C-RNTI (or, CG-RNTI or PG-RNTI) (S470). Also, the base station 30 may allocate downlink resources to the terminals 20, 21, and 23 by using CG-RNTI/PG-RNTI (S480). That is, the base station 30 may transmit a downlink scheduling message to the terminals 20, 21, and 23 through PDCCH.

The second receiving terminal 22 may transmit the public safety information to the terminals 20, 21, and 23 via the base station. That is, the terminal 22 may transmit the public safety information to the base station 30 through PUSCH (S490), and the base station 30 may transmit the information received from the terminal 22 to the terminals 20, 21, and 23 through PDSCH (S500).

Hereinafter, a groupcast (or, broadcast) based public safety communication method for the out-of-coverage environment will be explained in detail. In the out-of-coverage environment, transmission of resource allocation information and control information may be performed based on a distributed control manner. As an example of the conventional distributed control manner (access scheme), there is a carrier sense multiple access/collision avoidance (CSMA/CA) scheme used in a wireless local area network (WLAN).

The CSMA/CA scheme comprises two steps. A first step (a procedure of CSMA) is a step which should be essentially performed, and a second step (a procedure of CA) is an optional step which can be omitted if it is not necessary.

First, the first step (the CSMA procedure) will be explained in detail. A node wanting to transmit a packet may monitor an occupation status of a channel during a distributed interframe space (DIFS). The DIFS has a time length longer than a short interframe space (SIFS), and is defined in the IEEE 802.11 standard as a below equation 1.

$$DIFS=SIFS+(2 \times aSlotTime) \quad \text{[Equation 1]}$$

A below table 3 represents aSlotTime, SIFS, and DIFS which are defined in the IEEE 802.11 standard.

TABLE 3

| Standard | aSlotTime (μsec) | SIFS (μsec) | DIFS (μsec) |
| --- | --- | --- | --- |
| IEEE 802.11b | 20 | 10 | 50 |
| IEEE 802.11a | 9 | 16 | 34 |
| IEEE 802.11g | 9 or 20 | 10 | 28 or 50 |

If the channel status is in a busy state during a DIFS, the node may delay its packet transmission. Meanwhile, even though the channel status is in a non-busy state during a DIFS, the node cannot transmit a packet immediately after the DIFS. The reason is that collisions may occur if all nodes try to simultaneously transmit packets. Thus, if the channel status is in a non-busy state during a DIFS, the node can try to start its packet transmission after expiration of a backoff time. The backoff time may be defined as a below equation 2.

$$BackoffTime=random( ) \times aSlotTime \quad \text{[Equation 2]}$$

Figure 8:
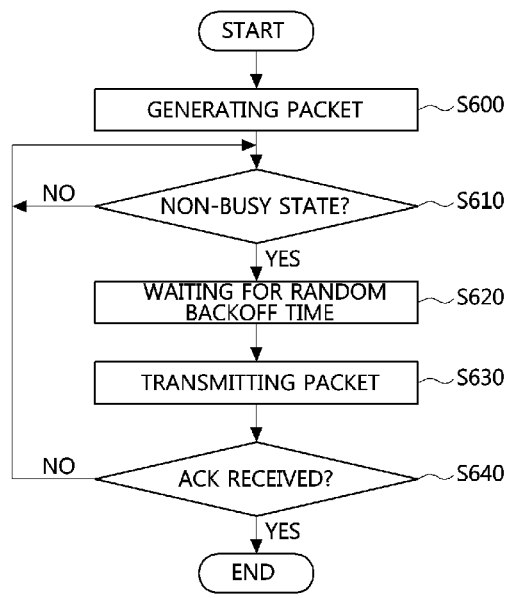
FIG. 8 is a flow chart illustrating a CSMA procedure.
Figure 9:
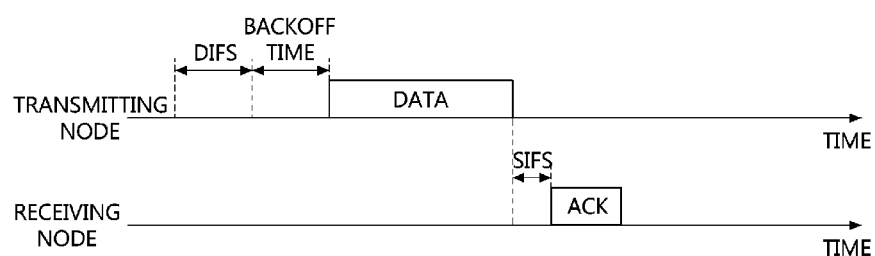
FIG. 9 is a conceptual diagram illustrating a CSMA procedure.

FIG. 8 is a flow chart illustrating a CSMA procedure, and FIG. 9 is a conceptual diagram illustrating a CSMA procedure.

Referring to FIG. 8 and FIG. 9, a transmitting node may generate a packet (S600), and monitor an occupation status of a channel during a DIFS in order to transmit the generated packet (S610). If the channel status is in a busy state during a DIFS, the transmitting node may delay its packet transmission. On the contrary, if the channel status is in a non-busy state during a DIFS, the transmitting node can try to start its packet transmission based on a random backoff procedure. In other words, the transmitting node may monitor an occupation status of the channel during a random backoff time after the DIFS (that is, packet transmission is delayed by the random backoff time) (S620). After the monitoring, if the channel state is in a non-busy state during the random backoff time, the transmitting node can start to transmit the packet after expiration of the random backoff time (S630).

The transmitting node can check whether an acknowledgement (ACK) message in response to the packet is received or not after expiration of a SIFS from a completion time of the packet transmission (S640). When the ACK message is received, the transmitting node can determine that the packet is successfully received by a receiving node, and accordingly finish its packet transmission procedure. On the contrary, when ACK message is not received during a predefined time, the transmitting node can determine that the packet is not successfully received by the receiving node, and accordingly try retransmission of the packet. Meanwhile, since a time interval between the data packet and the ACK message is configured as a SIFS which is shorted than a DIFS, other nodes cannot intercept the channel.

Then, the second step, the CA procedure will be explained in detail. Before the CA procedure is explained, a hidden node problem and an exposed node problem, which are important reasons causing performance degradation of the CSMA procedure, will be explained.

Figure 10:
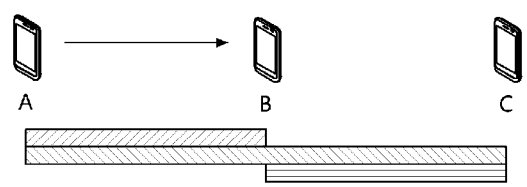
FIG. 10 is a conceptual diagram illustrating the hidden node problem.

FIG. 10 is a conceptual diagram illustrating the hidden node problem.

Referring to FIG. 10, when a node A transmits a frame to a node B, a node C identifies that a channel is in a non-busy state. In this case, if the node C tries to transmit a frame to the node B, frame collision may occur in the node B. That is, since the node C tries to use a channel resource which it should not use, performance degradation in a communication system according to the IEEE 802.11 standard may occur.

Figure 11:
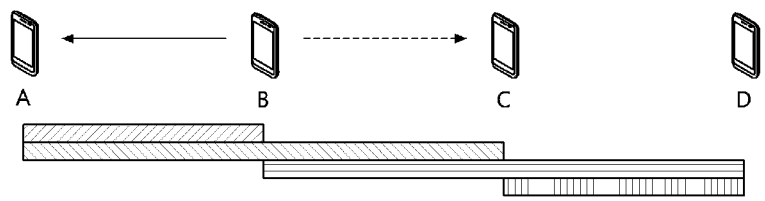
FIG. 11 is a conceptual diagram illustrating the exposed node problem.

FIG. 11 is a conceptual diagram illustrating the exposed node problem.

Referring to FIG. 11, when a node B transmits a frame to a node A, a node C identifies that a channel is in a busy state. In this case, even though the node C can transmit a frame to a node D, the node C cannot try to transmit the frame. That is, since the node C does not try to use a channel resource which it can use, performance degradation in a communication system according to the IEEE 802.11 standard may occur.

The CA procedure (that is, a Request-To-Send (RTS) frame and a Clear-To-Send (CTS) frame exchange procedure) has been introduced into the IEEE 802.11 standard in order to resolve the hidden node problem and the exposed node problem.

Figure 12:
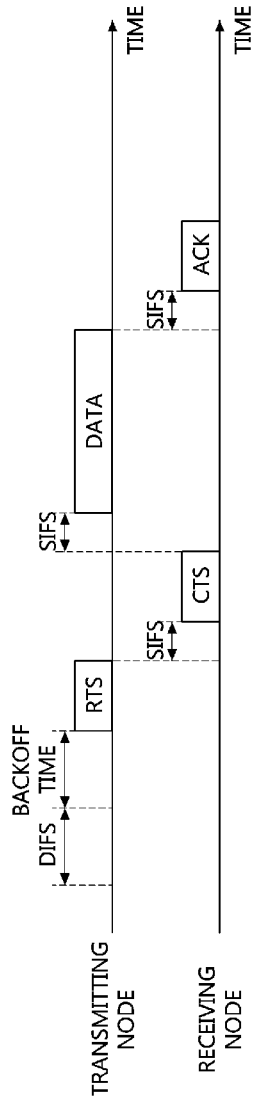
FIG. 12 is a conceptual diagram illustrating a procedure for exchanging a RTS frame to and a CTS frame.

FIG. 12 is a conceptual diagram illustrating a procedure for exchanging a RTS frame and a CTS frame.

Referring to FIG. 12, a transmitting node may monitor an occupation status of a channel during a DIFS. If the channel is identified to be in a non-busy state during a DIFS after the monitoring, a random backoff procedure may be performed. That is, the transmitting node may monitor an occupation status of the channel during a random backoff time after expiration of the DIFS. If the channel is identified to be in non-busy state during the random backoff time based on the monitoring, the transmitting node can transmit a RTS frame after expiration of the random backoff time.

A receiving node which receives the RTS frame may transmit a CTS frame in response to the RTS frame. When the transmitting node receives the CTS frame, it may transmit a data frame to the receiving node. If the receiving node receives the data frame successfully, the receiving node may transmit an ACK frame in response to the data frame to the transmitting node.

When the CSMA/CA scheme is used, the node A illustrated in FIG. 10 may transmit a RTS frame to the node B, and the node B may transmit a CTS frame in response to the RTS frame to the node A. In this case, although the node C cannot receive the RTS frame, it can receive the CTS frame. Since the node C which receives the CTS frame identifies that the channel is in busy state, it does not transmit its frame during a time indicated in the received CTS frame. Through the above procedure, the hidden node problem can be resolved.

When the CSMA/CA scheme is used, the node B illustrated in FIG. 11 may transmit a RTS frame to the node A, and the node A may transmit a CTS frame in response to the RTS frame to the node B. In this case, although the node C cannot receive the CTS frame, it can receive the RTS frame. Accordingly, the node C can assume that it is an exposed node and can determine that the channel can be used currently. Through the above procedure, the exposed node problem can be resolved.

The following table 4 represents a rule for determining a channel occupation status in the IEEE 802.11 standard.

TABLE 4

| RTS received? | CTS received? | Result of channel monitoring | Usability of channel |
|---|---|---|---|
| ○ | ○ | Busy | X |
| ○ | X | Exposed node | ○ |
| X | ○ | Hidden node | X |
| X | X | Non-busy | ○ |

Meanwhile, a RTS frame is used for determining a channel occupation status of a transmitting node, and a CTS frame is used for determining a channel occupation status of a receiving node. Thus, each node can determine a channel occupation status by using a data frame or an ACK frame. The reason is that a data frame may be used for determining a channel occupation status of the transmitting node and an ACK frame may be used for determining a channel occupation status of the receiving node.

Re-referring to FIG. 12, according to the IEEE 802.11 standard, frames may be classified into a RTS frame, a CTS frame, a data frame, and an ACK frame. Also, in consideration of a beacon frame which is transmitted as a data frame for synchronization and network management, frames according to the IEEE 802.11 standard may be classifies into five types.

An asynchronous CSMA/CA based on an orthogonal frequency division multiplexing (OFDM) used in a communication system according to the IEEE 802.11 standard is a method in which multiple nodes contend for a single channel in order to transmit various types of frames. Therefore, if the number of contending nodes increases or amount of traffic increases, performance of the communication system may degrade rapidly.

When a synchronous distributed control algorithm (or, a synchronous autonomous scheduling algorithm) based on orthogonal frequency division multiple access (OFDMA) is introduced into the communication system according to the IEEE 802.11 standard, performance of the communication system may be significantly enhanced.

The synchronous manner (it means that all nodes in a network can acquire network-synchronization so that all nodes can identify a start point and an end point of a frame identically) can increase amount of traffic which can be processed and decrease power consumption of each node as compared to the asynchronous manner. Also, since the OFDMA manner can use only necessary subcarriers, it can increase a communication distance by power concentration and use time-frequency resources more efficiently as compared to the OFDM manner which simultaneously uses all subcarriers.

In order to use the synchronous manner, a frame structure should be predefined. Also, all nodes in a network should have information about a start point, a periodicity, and a structure of a frame in advance.

Figure 13:
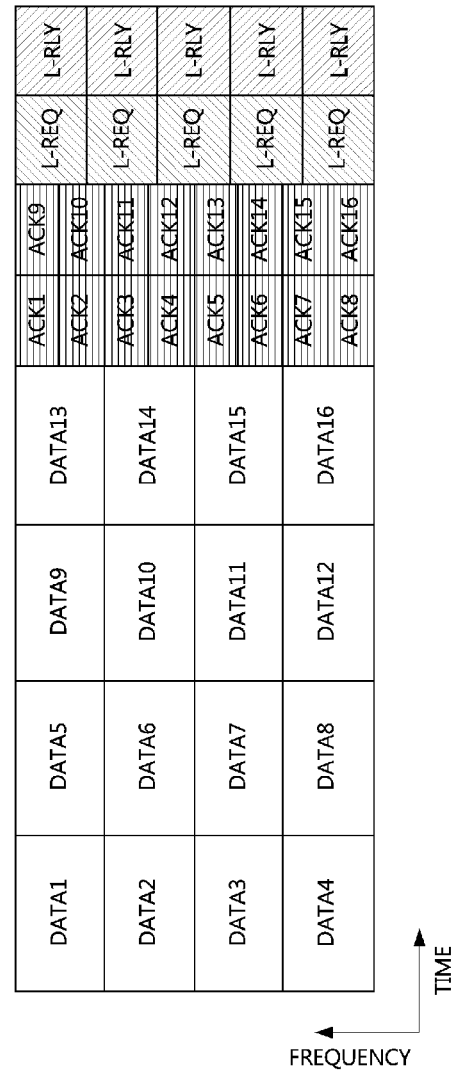
FIG. 13 is a block diagram illustrating a multi-channel frame according to an example embodiment of the present invention.

FIG. 13 is a block diagram illustrating a multi-channel frame according to an example embodiment of the present invention.

Referring to FIG. 13, a multi-channel frame may comprise 16 data channels, 16 ACK channels, 5 link-request (L-REQ) channels, and 5 link-reply (L-RLY) channels. Each of the to data channels corresponds to each of the ACK channels. For example, a first data channel DATA1 corresponds to a first ACK channel ACK1, and a second data channel DATA2 corresponds to a second ACK channel ACK2. Also, each of the L-REQ channels corresponds to each of the L-RLY channels. For example, a L-REQ1 corresponds to a L-RLY1, and a L-REQ2 corresponds to a L-RLY2. However, data channels do not have one-to-one relations with the L-REQ channels or the L-RLY channels. Similarly, ACK channels do not have one-to-one relations with the L-REQ channels or the L-RLY channels.

The multi-channel frame can provide additional advantages as well as the above-described advantages of the OFDMA based synchronous distributed control manner. The below table 5 shows advantages which can be provided by the multi-channel frame.

TABLE 5

| | OFDM based asynchronous single channel CSMA/CA (conventional WLAN) | OFDMA based synchronous distributed control |
|---|---|---|
| Flexibility | No flexibility (RTS-CTS-DATA-ACK) | Very flexible DATA/ACK resource pool L-REQ/L-RLY resource pool Beacon pool |
| Service | Singe service type (best effort) | Multimedia service (QoS guaranteed) VoIP Data |
| Application | | Terminal-relay (or, multi-hop) |

When a single frame comprises a resource pool for data channels, a resource pool for ACK channels, a resource pool for L-REQ channels, a resource pool for L-RLY channels, and a resource pool for beacons, a communication system can achieve considerable flexibility. That is, in a single frame, a pair of nodes can perform a link setup procedure, and another pair of nodes can perform a voice over internet protocol (VoIP) service. At the same time, other pair of nodes can perform transmission of video data demanding a relatively large bandwidth. Also, since each node can use at least one data channel on the basis of reservation, a Quality of Service (QoS) of a streaming service can be guaranteed. Also, since a node can simultaneously process multiple data channels, a multi-hop function can be performed.

Figure 14:
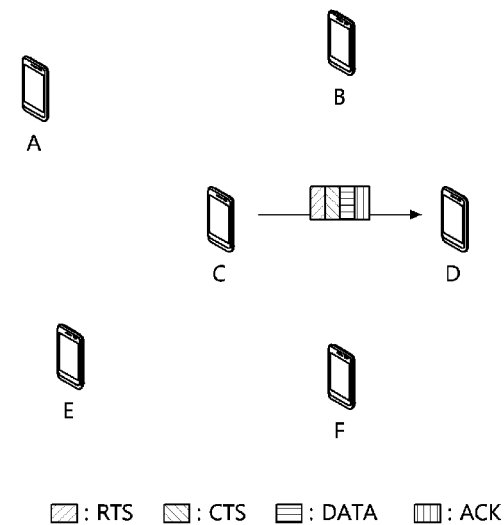
FIG. 14 is a conceptual diagram illustrating an asynchronous single channel CSMA/CA scheme based on OFDM.

FIG. 14 is a conceptual diagram illustrating an asynchronous single channel CSMA/CA scheme based on OFDM.

Referring to FIG. 14, a transmitting node C may transmit a RTS frame to a receiving node D. The receiving node D may transmit a CTS frame in response to the RTS frame to the transmitting node C. When the transmitting node C receives the CTS frame, it may transmit a data frame to the receiving node D. When the receiving node D receives the data frame, it may transmit an ACK frame to the transmitting node C.

Hereinafter, a link setup procedure in a synchronous distributed control manner based on OFDMA will be explained in detail.

Figure 15:
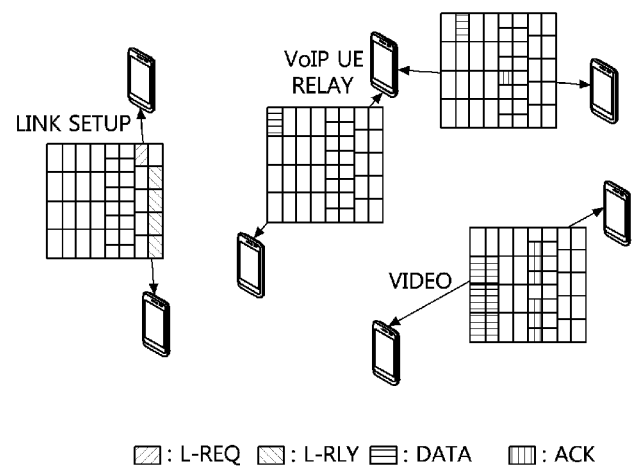
FIG. 15 is a conceptual diagram illustrating a synchronous distributed control manner based on OFDMA.

FIG. 15 is a conceptual diagram illustrating a synchronous distributed control manner based on OFDMA. Here, each node may operate based on the multi-channel frame illustrated in FIG. 13.

Referring to FIG. 15, in a link setup procedure, a transmitting node may sense occupation statuses of ACK channels included in a $n^{th}$ frame, and generate a non-busy ACK table including information on ACK channels in non-busy state. For example, when non-busy ACK channels are ACK channels 1 to 16, the transmitting node may generate the non-busy ACK table ({1, 2, . . . . , 16}). Here, the non-busy ACK table can be configured as a bitmap. The transmitting node may generate a L-REQ message including a source node (that is, a transmitting node) identifier, a destination node (that is, a receiving node) identifier, buffer status information of the source node, and the non-busy ACK table. Also, the transmitting node may transmit the L-REQ message through a L-REQ channel included in the $n^{th}$ frame.

On the other hand, the receiving node may sense occupation statuses of data channels included in the $n^{th}$ frame, and generate a non-busy data table including information on data channels in non-busy state. For example, when non-busy data channels are data channels 1 to 3, the receiving node may generate the non-busy data table ({1, 2, 3}). Here, the non-busy data table can be configured as a bitmap.

When the receiving node receives the L-REQ message, it may generate a grant table based on the non-busy ACK table included in the L-REQ message and the generated non-busy data table. That is, the receiving node may generate the grant table including common information (that is, the non-busy ACK table 11 the non-busy data table) among the non-busy ACK table and the non-busy data table. For example, in the above example, the receiving node may generate the grant table ({1, 2, 3}). Here, the grant table may also be configured as a bitmap. The receiving node may transmit the L-RLY message including the generated grant table to the transmitting node through a L-RLY channel included in the $n^{th}$ frame. The L-RLY message may include an identifier of a source node, an identifier of a destination node, the grant table, etc.

The transmitting node may transmit data through data channels corresponding to the grant table ({1, 2, 3}) in $(n+1)^{th}$ frame, and receive ACK messages in response to the transmitted data through ACK channels corresponding to the grant table ({1, 2, 3}). Also, the receiving node may receive the data through data channels corresponding to the grant table ({1, 2, 3}) in $(n+1)^{th}$ frame, and transmit ACK messages in response to the received data through ACK channels corresponding to the grant table ({1, 2, 3}). The transmitting node and the receiving node can use the data channels corresponding to the grant table and the ACK channels corresponding to the grant table until they release the channels for themselves. The reason is that other nodes identify the corresponding channels are in busy state as long as the transmitting node and the receiving node occupy the data channels and the ACK channels.

Figure 16:
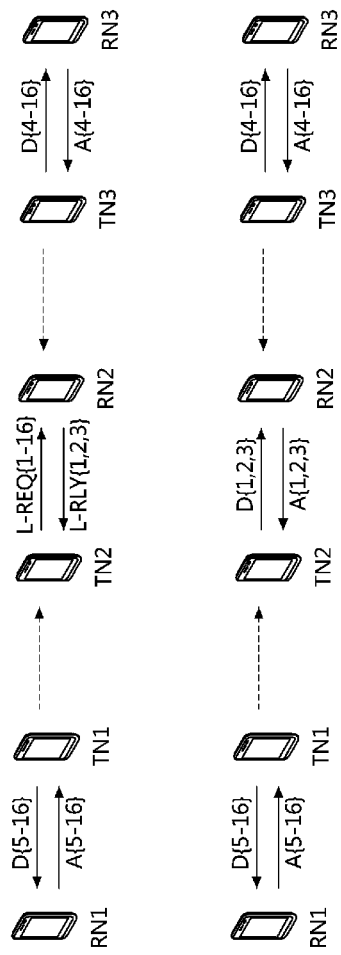
FIG. 16 is a conceptual diagram illustrating a method for generating a grant table.

FIG. 16 is a conceptual diagram illustrating a method for generating a grant table. Here, each node may operate based on the multi-channel frame illustrated in FIG. 13.

Referring to FIG. 16, a second receiving node RN2 may receive a L-REQ message including a non-busy ACK table ({1, 2, . . . , 16}) from a second transmitting node TN2 through a L-REQ channel. If the second receiving node RN2 generates the grant table by considering only the non-busy ACK table received from the second transmitting node TN2, collision between transmitted data may occur. That is, since a third transmitting node TN3 transmits data through data channels 4 to 16, data transmission of the second transmitting node TN2 through the data channels 4 to 16 can generate data collision.

Meanwhile, a transmitting node can randomly select a L-REQ channel, and transmit a L-REQ message through the selected L-REQ channel. Since L-REQ channels and L-RLY channels have one-to-one relations, in case that the transmitting node transmits the L-REQ message through a $k^{th}$ L-REQ channel, the transmitting node should receive a L-RLY message through a $k^{th}$ L-RLY channel. If the transmitting node does not receive a L-RLY message through a L-RLY channel of a current frame, the transmitting node cannot transmit data in a next frame. Thus, a link setup procedure (that is, a procedure of exchanging a L-REQ message and a L-RLY message) should be performed again.

For the link setup procedure, a node should recognize adjacent nodes. A node can recognize adjacent node based on beacons transmitted through beacon channels. That is, a node can notify its existence to adjacent node by transmitting its beacon through a randomly selected beacon channel, and generate a list of adjacent nodes by obtaining information on adjacent nodes transmitted through other beacon channels.

A node can select a beacon channel randomly with a constant interval similarly to the selection of a L-REQ channel, and transmit its beacon through the selected beacon channel. The beacon can be transmitted with a synchronization reference signal. Also, a node can obtain synchronization by using the synchronization reference signal. Here, synchronization obtained based on the synchronization reference signal is not a network-level synchronization but a link-level synchronization. The node which obtains the link-level synchronization can identify a start point of a beacon channel, and receive beacons transmitted through beacon channels.

A node wanting to transmit data (a transmitting node), among nodes which identified existences of each other based on transmission/receptions of the beacons, can transmit a synchronization reference signal and a beacon periodically (for example, once for every 2 frames). In this case, other nodes can obtain synchronization based on the synchronization reference signal received from the transmitting node, and can transmit and receive data according to the above-described multi-channel frame structure. If there is not a node wanting to transmit data, nodes can transmit and receive beacons in non-synchronized states.

In the above-described link setup procedure, the following collision can occur.

Figure 17:
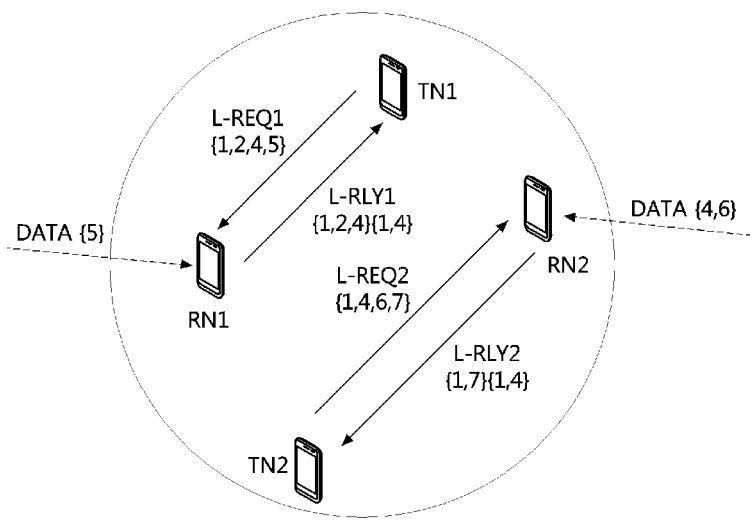
FIG. 17 is a conceptual diagram illustrating a situation in which a collision occurs in the link setup procedure.

FIG. 17 is a conceptual diagram illustrating a situation in which a collision occurs in the link setup procedure. Here, each node may operate based on the multi-channel frame illustrated in FIG. 13.

Referring to FIG. 17, all of a first transmitting node TN1, a second transmitting node TN2, a first receiving node RN1, and a second receiving node RN2 are located in communication ranges of each other. The first transmitting node TN1 can transmit a L-REQ message including a non-busy ACK table ({1, 2, 4, 5}) to the first receiving terminal RN1 through a first L-REQ channel. The first receiving terminal RN1 can generate a grant table to ({1, 2, 4}) based on the non-busy ACK table received from the first transmitting node TN1, and transmit a L-RLY message including the generated grant table ({1, 2, 4}) to the first transmitting terminal TN1 through a first L-RLY channel.

Meanwhile, the second transmitting node TN2 can transmit a L-REQ message including a non-busy ACK table ({1, 4, 6, 7}) to the second receiving terminal RN2 through a second L-REQ channel. The second receiving terminal RN2 can generate a grant table ({1, 7}) based on the non-busy ACK table received from the second transmitting node TN2, and transmit a L-RLY message including the generated grant table ({1, 7}) to the second transmitting terminal TN2 through a second L-RLY channel. In this case, if both the first transmitting node TN1 and the second transmitting node TN2 transmit data through a first data channel in a next frame, a collision between the data transmitted by two nodes can occur.

In order to prevent the above situation, each of the receiving node RN1 and RN2 may generate a collision table by considering all non-busy ACK tables received from adjacent transmitting nodes TN1 and TN2. That is, the first receiving node RN1 may generate a collision table ($\{1, 4\}$) in consideration of the non-busy ACK table ($\{1, 2, 4, 5\}$) received from the first transmitting node TN1 and the non-busy ACK table ($\{1, 4, 6, 7\}$) received from the second transmitting node TN2. Then, the first receiving node RN1 may transmit a L-RLY message including the generated collision table and grant table to the first transmitting node TN1 through a first L-RLY channel. Also, the second receiving node RN2 may generate a collision table ($\{1, 4\}$) in consideration of the non-busy ACK table ($\{1, 4, 6, 7\}$) received from the second transmitting node TN2 and the non-busy ACK table ($\{1, 2, 4, 5\}$) received from the first transmitting node TN1. Then, the second receiving node RN2 may transmit a L-RLY message including the generated collision table and grant table to the second transmitting node TN2 through a second L-RLY channel.

On the other hand, a transmitting node which receives a L-RLY message through a $k^{th}$ L-RLY channel will operate as follows. If only a grant table exists in the received L-RLY message, the transmitting node can perform a link setup procedure without decoding other L-RLY channels except the $k^{th}$ L-RLY channel. On the contrary, if both a grant table and a collision table exist in the received L-RLY message, the transmitting node can decode all L-RLY channels (including the $k^{th}$ L-RLY channel and other L-RLY channels).

Here, when each of the transmitting nodes TN1 and TN2 receives both the first L-RLY message and the second L-RLY message, it can identify that a first data channel is in a contention state. In this case, each of the transmitting node TN1 and TN2 may not use the first data channel in contention state (that is, a collision avoidance manner). Alternatively, a transmitting node having higher priority (that is, TN1 or TN2) may use the first data channel in contention state (that is, a priority occupation manner). Alternatively, each node can use the channel in contention state with a probability of (1/n) when the number of contending nodes is n (that is, a random occupation manner).

In order to prevent a collision between messages, the L-REQ message may include an identifier of a source node, an identifier of a destination node, buffer status information, a non-busy ACK table, information on priorities, etc. Also, the L-RLY message may include an identifier of a source node, an identifier of a destination node, a grant table, a collision table, information on priorities, etc.

Figure 18:
FIG. 18 is a conceptual diagram illustrating an example embodiment for a network environment where pairs of nodes are located as spaced.
Figure 19:
FIG. 19 is a conceptual diagram illustrating another example embodiment for a network environment where pairs of nodes are located as spaced.

FIG. 18 is a conceptual diagram illustrating an example embodiment for a network environment where pairs of nodes are located as spaced, and FIG. 19 is a conceptual diagram illustrating another example embodiment for a network environment where pairs of nodes are located as spaced. Here, each node may operate based on the multi-channel frame illustrated in FIG. 13.

Referring to FIG. 18 and FIG. 19, since a first receiving node RN1 is located out of a communication range from a second transmitting node TN2, it cannot receive a second L-REQ message from the second transmitting node TN2. Thus, the first receiving node RN1 cannot generate a collision table. Similarly, since a second receiving node RN2 is located out of a communication range from a first transmitting node TN1, it cannot receive a first L-REQ message from the first transmitting node TN1. Thus, the second receiving node RN2 cannot generate a collision table.

Figure 20:
FIG. 20 is a conceptual diagram illustrating an example embodiment for a network environment where pairs of nodes are located as intersected with each other.

FIG. 20 is a conceptual diagram illustrating an example embodiment for a network environment where pairs of nodes are located as intersected with each other. Here, each node may operate based on the multi-channel frame illustrated in FIG. 13.

Referring to FIG. 20, since a first receiving node RN1 can receive both a first L-REQ message and a second L-REG message, it can generate a grant table ($\{1, 4, 5\}$) and a collision table ($\{1, 4\}$), and transmit a first L-RLY message including the generated grant table and collision table to the first transmitting node TN1 through a first L-RLY channel. Then, the first transmitting node TN1 which receives the first L-RLY message can occupy a data channel by using one of the above-described manners (the collision avoidance manner, the priority occupation manner, and the random occupation manner).

Meanwhile, since a second receiving node RN2 can receive only a second L-REQ message, it can generate a grant table ($\{1, 4\}$), and transmit a second L-RLY message including the generated grant table to a second transmitting node TN2 through a second L-RLY channel. Then, the transmitting node TN2 can occupy a data channel by referring to the received grant table. If the second transmitting node TN2 receives the first L-RLY message, it can identify that it is an exposed node.

Figure 21:
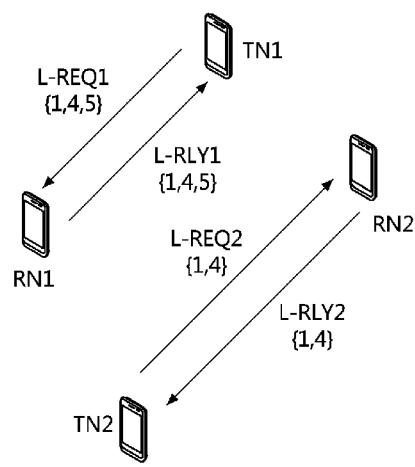
FIG. 21 is a conceptual diagram illustrating an example embodiment for a network environment where receiving nodes are located as spaced

FIG. 21 is a conceptual diagram illustrating an example embodiment for a network environment where receiving nodes are located as spaced. Here, each node may operate based on the multi-channel frame illustrated in FIG. 13.

Referring to FIG. 21, a first receiving node RN1 is located in communication ranges from a first transmitting node TN1 and a second transmitting node TN2, and located out of a communication range from a second receiving node RN2. Also, the second receiving node RN2 are located in communication ranges from the first transmitting node TN1 and the second transmitting node TN2, and located out of a communication range from the first receiving node RN1.

Therefore, the first receiving node RN1 can receive a first L-REQ message from the first transmitting terminal TN1 and a second L-REQ message from the second transmitting terminal TN2. Thus, it can transmit a first L-RLY message including a grant table and a collision table to the first transmitting terminal TN1. In this case, the first transmitting terminal TN1 can occupy a data channel by using one of the above-described manners (the collision avoidance manner, the priority occupation manner, and the random occupation manner).

Also, the second receiving node RN2 can receive the first L-REQ message from the first transmitting terminal TN1 and the second L-REQ message from the second transmitting terminal TN2. Thus, it can transmit a second L-RLY message including a grant table and a collision table to the second transmitting terminal TN2. In this case, the second transmitting terminal TN2 can occupy a data channel by using one of the above-described manners (the collision avoidance manner, the priority occupation manner, and the random occupation manner).

Figure 22:
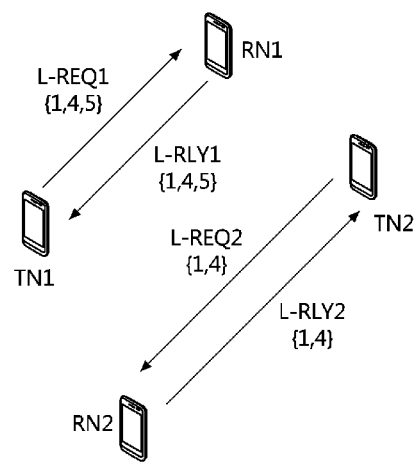
FIG. 22 is a conceptual diagram illustrating an example embodiment for a network environment where transmitting nodes are located as spaced.

FIG. 22 is a conceptual diagram illustrating an example embodiment for a network environment where transmitting nodes are located as spaced. Here, each node may operate based on the multi-channel frame illustrated in FIG. 13.

Referring to FIG. 22, a first transmitting node TN1 is located out of a communication range from a second transmitting node TN2. A first receiving node RN1 is located in communication ranges from the first transmitting node TN1, the second transmitting node TN2, and a second receiving node RN2. Also, the second receiving node RN2 is in communication ranges from the first transmitting node TN1, the second transmitting node TN2, and the first receiving node RN1.

Therefore, the first receiving node RN1 can receive a first L-REQ message from the first transmitting terminal TN1 and a second L-REQ message from the second transmitting terminal TN2. Thus, it can transmit a first L-RLY message including a grant table and a collision table to the first transmitting terminal TN1. In this case, the first transmitting terminal TN1 can occupy a data channel by using one of the above-described manners (the collision avoidance manner, the priority occupation manner, and the random occupation manner).

Also, the second receiving node RN2 can receive the first L-REQ message from the first transmitting terminal TN1 and the second L-REQ message from the second transmitting terminal TN2. Thus, it can transmit a second L-RLY message including a grant table and a collision table to the second transmitting terminal TN2. In this case, the second transmitting terminal TN2 can occupy a data channel by using one of the above-described manners (the collision avoidance manner, the priority occupation manner, and the random occupation manner).

Figure 23:
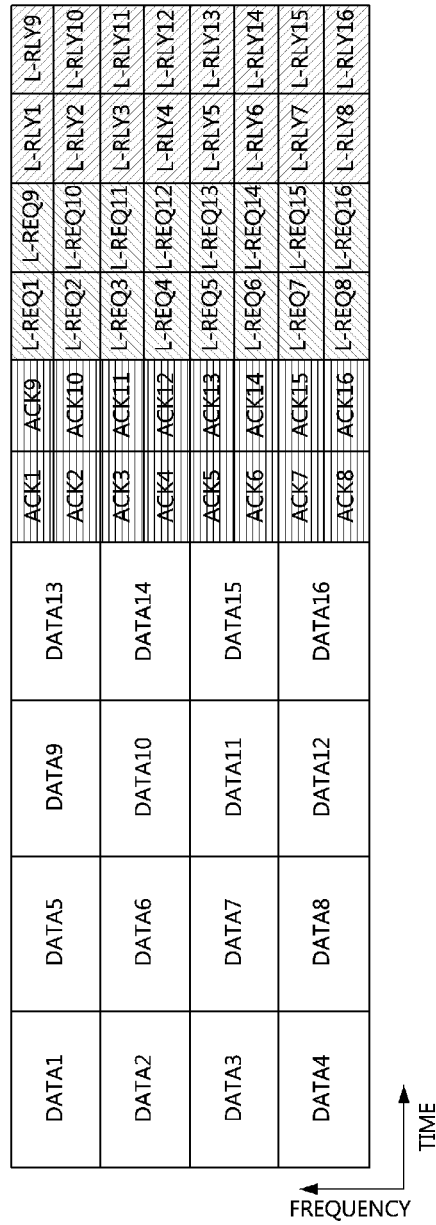
FIG. 23 is a block diagram illustrating a multi-channel frame according to another example embodiment of the present invention.

FIG. 23 is a block diagram illustrating a multi-channel frame according to another example embodiment of the present invention.

Referring to FIG. 23, a multi-channel frame may comprise 16 data channels, 16 ACK channels, 16 link-request (L-REQ) channels, and 16 link-reply (L-RLY) channels. The data channels, the ACK channels, the L-REQ channels, and the L-RLY channels have one-to-one relations. For example, a first data channel DATA1 corresponds to a first ACK channel ACK1, a first L-REQ channel L-REQ1, and a first L-RLY channel L-RLY1. That is, in case that the number of nodes is small or amount of traffic between nodes is small, the above-described multi-channel frame can be used. Here, since a position of a L-REQ channel (or, a L-RLY channel) is indicated by a position of a corresponding data channel (or, a corresponding ACK channel), a non-busy ACK table, a grant table, and a collision table in a bitmap format may not be used.

Meanwhile, even though a data channel and an ACK channel are occupied by a specific node, a L-REG channel and a L-RLY channel corresponding to the occupied data channel (or, ACK channel) may not be used. That is, if a link setup procedure is completed, a L-REQ channel and a L-RLY channel corresponding to a data channel and an ACK channel may not be used during data transmission. In this case, L-REQ channels and L-RLY channels can be used for data transmission in order to enhance data transmission throughput. Also, L-REQ channels and L-RLY channels can be used for a priority handling procedure. In the priority handling procedure, yield of occupied channels is requested to a node occupying the channels, and the channels yielded from the node can be used.

Then, a link setup procedure for a groupcast (or, broadcast) based public safety communication will be explained in detail. Here, each node may operate based on the multi-channel frame illustrated in FIG. 23.

A transmitting node wanting to perform a groupcast (or, broadcast) transmission may request a groupcast (or, broadcast) link setup by using a L-REQ channel. That is, the transmitting node may transmit a L-REQ message including a groupcast (or, broadcast) identifier through a $k^{th}$ L-REQ channel. A receiving node which receives the L-REQ message through the $k^{th}$ L-REQ channel may notify the transmitting node whether a data channel can be used or not by using a $k^{th}$ L-RLY channel.

If the receiving node permits the transmitting node to use a data channel, it may transmit a null data message to the transmitting node through the $k^{th}$ L-RLY channel. On the contrary, if the receiving node does not permit the transmitting node to use a data channel, it may transmit a predefined code to the transmitting node through the $k^{th}$ L-RLY channel. That is, when the corresponding channel is already occupied by other node, the receiving node may transmit the predefined code to the transmitting node. Meanwhile, the transmitting node can detect the predefined code even when a plurality of receiving nodes transmit predefined codes simultaneously through the $k^{th}$ L-RLY channel.

The predefined code may be transmitted in a non-coherent manner (that is, a manner which does not need channel estimation) or in a coherent manner (that is, a manner which needs channel estimation). When the coherent manner is used, all receiving nodes belonging to a same group may transmit pilot signals having identical patterns to support the channel estimation.

When the predefined code is detected, the transmitting node may identify that a data channel cannot be used. On the contrary, when the predefined code is not detected, the transmitting node may identify that a data channel can be used, and perform a groupcast (or, broadcast) transmission of data through the corresponding data channel. Meanwhile, even though the predefined code is detected, the transmitting node may be configured to transmit data through the corresponding data channel.

Figure 24:
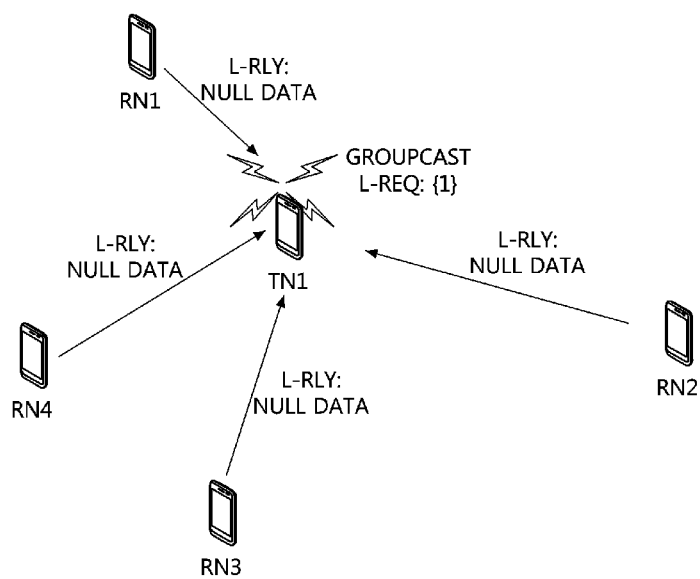
FIG. 24 is a conceptual diagram illustrating an example embodiment of a groupcast (or, broadcast) link setup procedure.

FIG. 24 is a conceptual diagram illustrating an example embodiment of a groupcast (or, broadcast) link setup procedure. Here, each node may operate based on the multi-channel frame illustrated in FIG. 23.

Referring to FIG. 24, a first transmitting node TN1 may transmit a L-REQ message requesting a groupcast (or, broadcast) link setup through a $k^{th}$ L-REQ channel. When receiving nodes RN1, RN2, RN3, and RN4 which receive the L-REQ message permit the first transmitting node TN1 to use a data channel, they may transmit a null data message to to the first transmitting node TN1 through a $k^{th}$ L-RLY channel.

Figure 25:
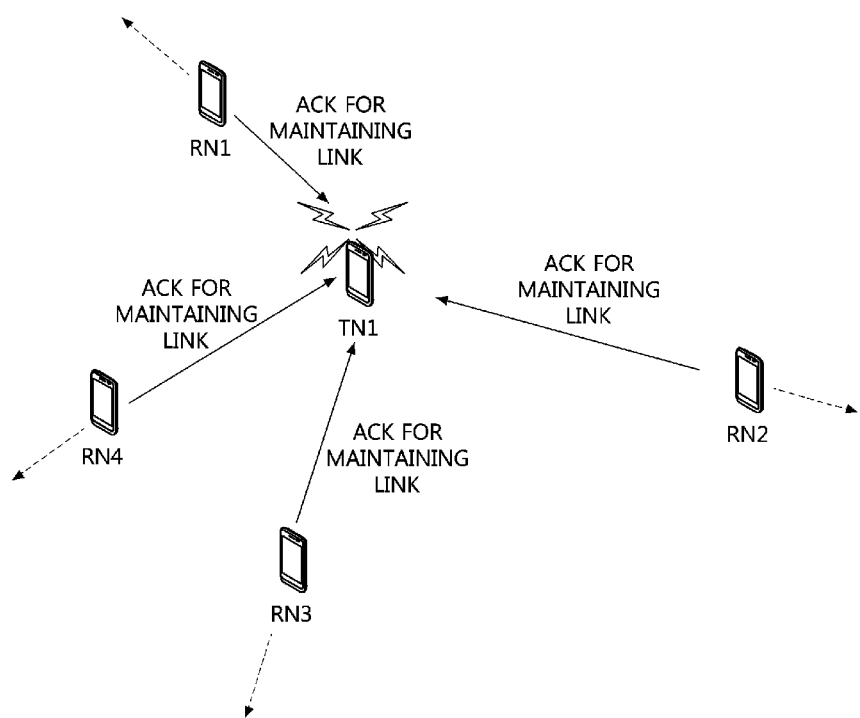
FIG. 25 is a conceptual diagram illustrating an example embodiment of a groupcast (or, broadcast) link maintaining procedure.

FIG. 25 is a conceptual diagram illustrating an example embodiment of a groupcast (or, broadcast) link maintaining procedure. Here, each node may operate based on the multi-channel frame illustrated in FIG. 23.

Referring to FIG. 25, a first transmitting node TN1 may perform a groupcast (or, broadcast) transmission of data through a $k^{th}$ data channel. Receiving nodes RN1, RN2, RN3, and RN4 which receive data may transmit an arbitrary message (for example, a message for maintaining a link) through a $k^{th}$ ACK channel in order to maintain an occupied status of the data channel. That is, the receiving nodes RN1, RN2, RN3, and RN4 may notify other nodes that they occupy the data channel by transmitting the arbitrary message. Other nodes which receive the arbitrary message through an ACK channel may identify that a corresponding data channel is occupied, and may not transmit data through the corresponding data channel. Based on the above-described procedure, a collision between data can be prevented.

Figure 26:
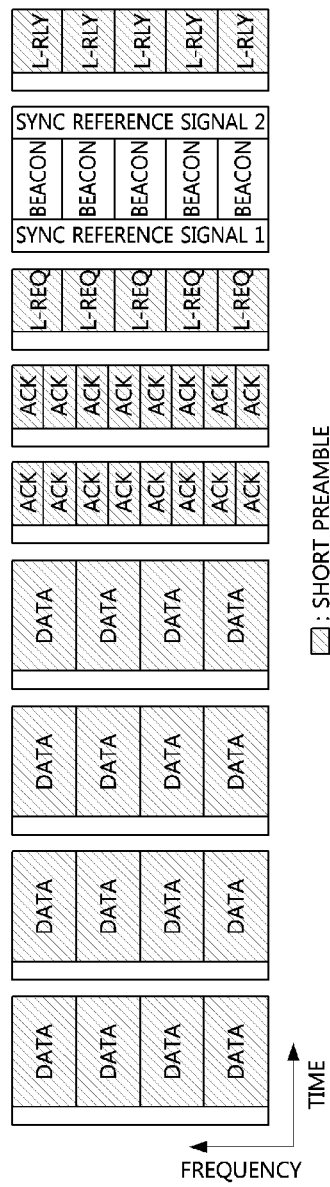
FIG. 26 is a block diagram illustrating a physical structure of a multi-channel frame according to still another example embodiment of the present invention.

FIG. 26 is a block diagram illustrating a physical structure of a multi-channel frame according to still another example embodiment of the present invention.

Referring to FIG. 26, a multi-channel frame may comprise 16 data channels, 16 ACK channels, 5 link-request (L-REQ) channels, 5 link-reply (L-RLY) channels, and 5 beacon channels. Also, the number of channels and positions of the channels may be configured variously. A short preamble can be used for an automatic gain control (AGC), and configured with at least one short OFDM symbol. For example, the short preamble may be configured with three short continuous OFDM symbols having formats such as {A, −A, A}. A first synchronization reference signal located before a beacon channel can be used for a link-level synchronization, and a second synchronization reference signal located after a beacon channel can be used for a propagation delay compensation.

A communication procedure based on the above-described multi-channel frame may be explained as follows. A node wanting to transmit a beacon may try to decode beacons transmitted from other nodes during a preconfigured period. Since a beacon is transmitted with a synchronization reference signal, a node, which does not obtain network synchronization, also can receive a beacon transmitted by other node. The reason is that a node can obtain link-level synchronization by using the synchronization reference signal received with the beacon.

A node can identify whether communications are currently performed in a network or transmission/reception of beacons are performed by trying to receive beacons transmitted from other node during a preconfigured period. That is, when communications are being performed in a network, the node can identify that a node transmitting synchronization reference signals and beacons periodically exists, and identify a current status by decoding the beacon transmitted by the corresponding node. When communications are not being performed in the network, the node can transmit a beacon by using an arbitrary time-frequency resource. On the contrary, when communications are being performed in the network, the node can transmit a beacon through a beacon channel included in the multi-channel frame.

Next, a priority handling procedure will be explained. In case that an emergent communication request occurs when all channels are occupied, a node can use a channel through a yield of another node which has already occupied the channel. That is, when a non-busy ACK table is ø, a node can select a L-REQ channel randomly, and the node can request other nodes to yield an occupied channel by transmitting a yield request table through the selected L-REQ channel.

Figure 27:
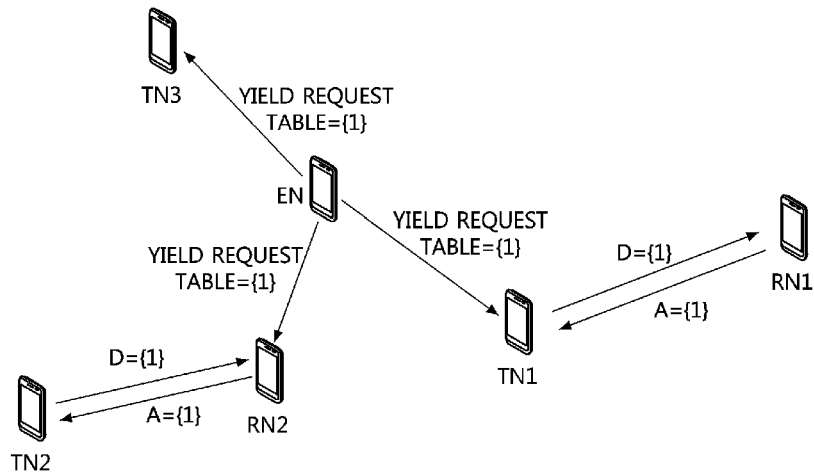
FIG. 27 is a conceptual diagram illustrating a priority handling procedure according to an example embodiment of the present invention.

FIG. 27 is a conceptual diagram illustrating a priority handling procedure according to an example embodiment of the present invention. Here, each node may operate based on the multi-channel frame illustrated in FIG. 13, 23, or 26.

Referring to FIG. 27, in case that an emergent communication request occurs when all channels are occupied, an emergency node EN may transmit a message including a yield request table ({1}) through an arbitrary L-REQ channel included in a $n^{th}$ frame. Here, the yield request table ({1}) means a request of yielding a first data channel. When the first transmitting node TN1 receives the yield request table, it may notify the first receiving node RN1 that it will stop using the first data channel through the first data channel included in $(n+1)^{th}$ frame. Then, the first receiving node RN1 can decode the first data channel included in the $(n+1)^{th}$ frame, and transmit a response message including a result of the decoding (for example, an ACK message or a NACK message) to the first transmitting node TN1 through an ACK channel included in the $(n+1)^{th}$ frame. Then, the first transmitting node TN1 and the first receiving node RN1 can stop using the first data channel and the first ACK channel from a $(n+2)^{th}$ frame.

Alternatively, if the first transmitting node TN1 receives a yield request table ({1}) through a L-REQ channel included in the $n^{th}$ frame, it can stop using the first data channel from the $(n+1)^{th}$ frame. Thus, when the first receiving node RN1 does not receive data through the first data channel included in the $(n+1)^{th}$ frame, it can identify that the use of the first data channel is stopped, and so stop using the first ACK channel. In other words, the first transmitting node TN1 and the first receiving node RN1 can yield the channels occupied by them (that is, the first data channel and the first ACK channel) from the $(n+1)^{th}$ frame.

Meanwhile, when the second receiving node RN2 receives a message including a yield request table ({1}) through an arbitrary L-REQ channel included in the $n^{th}$ frame, it may request the second receiving node TN2 to stop using the first data channel included in the $(n+2)^{th}$ frame through the first ACK channel included in the $(n+1)^{th}$ frame. Here, the first ACK channel can be used for transmitting at least one of an ACK message, a NACK message, a message requesting to stop using a corresponding data channel, a null data message, etc. When the second transmitting node TN2 is requested to stop using the first data channel through the first ACK channel included in the $(n+1)^{th}$ frame, it may stop using the first data channel from the $(n+2)^{th}$ frame. Also, the second receiving node RN2 may stop using the first ACK channel from the $(n+2)^{th}$ frame.

Alternatively, when the second receiving node RN2 receives a message including a yield request table ({1}) through an arbitrary L-REQ channel included in the $n^{th}$ frame, it may stop using the first ACK channel from the $(n+1)^{th}$ frame. When the second transmitting node TN2 does not receive an ACK message or a NACK message through the first ACK channel included in the $(n+1)^{th}$ frame (that is, when a message transmission through the first ACK channel does not exist), it can identify that the use of the first data channel is stopped, and so stop using the first data channel from the $(n+2)^{th}$ frame. In other words, the second receiving node RN2 can stop using the first ACK channel from the $(n+1)^{th}$ frame, and the second transmitting node TN2 can stop using the first data channel from the $(n+2)^{th}$ frame.

Through the above-described methods, in case that an emergent communication request occurs when all channels are occupied, a channel being used by other nodes may be yielded to an emergency node EN. That is, the emergency node EN may transmit a L-REQ message including priority information through the channel yielded by other nodes so as to perform a link setup procedure, and then transmit data through the corresponding data channel after the link setup procedure.

On the other hand, a broadcast based public safety communication may be the most important mean in a public safety application in which an infrastructure is destroyed. Also, when a broadcast is supported in a physical layer, upper layer functions may be defined in order to support a unicast and a groupcast. In the following descriptions, a method for to supporting a broadcast in the physical layer based on the above-described methods will be explained.

When the infrastructural functions are stopped, a transmitting and receiving entity may become a terminal. Since a broadcast is a one-to-all transmission, all terminals except a transmitting terminal can receive a frame transmitted from the transmitting terminal. In case of a broadcast transmission, since all terminals except the transmitting terminal perform a receiver function, it may be very inefficient that the transmitting terminal requests a scheduling and is granted to occupy a broadcasting channel (BCH) by all receiving terminals. Since each of the receiving terminals can accept or reject a scheduling request of the transmitting terminal according to a network status and its status, it is very difficult that all receiving terminals accept or reject the scheduling request simultaneously.

Therefore, in a broadcast transmission based on a commercial system such as a terrestrial trunked radio (TETRA) direct mode operation (DMO), a transmitting terminal which detects a non-busy channel may broadcast a message through the detected non-busy channel without any additional procedures (for example, a scheduling request, a scheduling grant, etc.). If a plurality of transmitting terminals broadcast messages through a same channel, a collision between the messages may occur.

Figure 28:
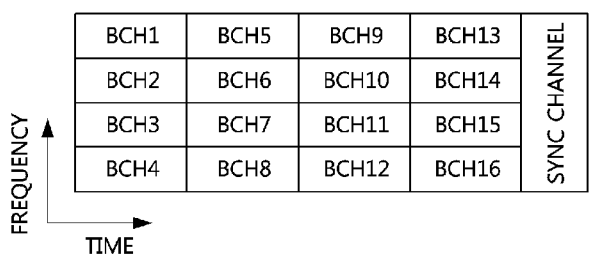
FIG. 28 is a block diagram illustrating a first broadcast frame according to an example embodiment of the present invention.

FIG. 28 is a block diagram illustrating a first broadcast frame according to an example embodiment of the present invention.

Referring to FIG. 28, time-frequency resources of the first broadcast frame may be configured with two parts. The most of the resources may be configured as BCH, and the rest of the resources may be configured as synchronization channel. Here, channels used for feedback of a receiving terminal such as ACK channels may not be included in the first broadcast frame. The preamble for automatic gain control illustrated in FIG. 26 and a gap for TX/RX switching may be included in the first broadcast frame.

A transmitting terminal can detect at least one BCH in a $n^{th}$ frame which is not occupied by other terminal, and select at least one BCH among the detected BCHs. Also, the transmitting terminal can broadcast a message through the selected BCH from a $(n+1)^{th}$ frame. The transmitting terminal can transmit the message through the corresponding BCH until it releases the occupation. On the other hand, in case that the first broadcast frame is used in the above-described manner, since a plurality of transmitting terminals can occupy a same BCH, a collision between messages transmitted by a plurality of terminals may occur.

Figure 29:
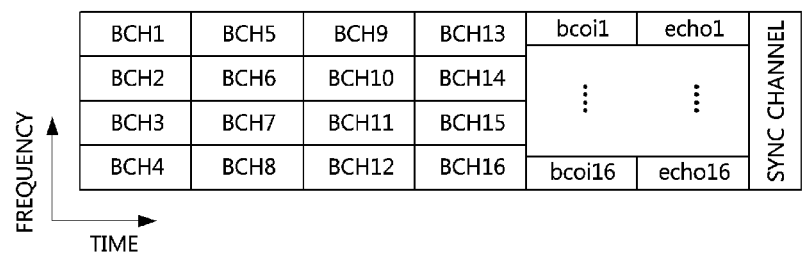
FIG. 29 is a block diagram illustrating a second broadcast frame according to an example embodiment of the present invention.

FIG. 29 is a block diagram illustrating a second broadcast frame according to an example embodiment of the present invention.

Referring to FIG. 29, time-frequency resources of the second broadcast frame may be configured with three parts. That is, the second broadcast frame may comprise BCHs, channels used for checking occupation statuses of the BCHs (such as a BCH occupation indication channels (hereinafter, referred to as 'bcoi channel'), echo channels), and at least one synchronization channel. Here, the second broadcast frame may comprise 16 BCHs, 16 bcoi channels, 16 echo channels, and a single synchronization channel. BCHs, bcoi channels and echo channels may have one-to-one relations. The preamble for automatic gain control illustrated in FIG. 26 and a gap for TX/RX switching may be included in the second broadcast frame.

When a transmitting terminal wants to transmit a message through a $k^{th}$ BCH included in a $(n+1)^{th}$ frame, it may notify that it will occupy the $k^{th}$ BCH included in the $(n+1)^{th}$ frame through a $k^{th}$ bcoi channel included in the $n^{th}$ frame. That is, the transmitting terminal may notify that it will occupy the $k^{th}$ BCH of the $(n+1)^{th}$ frame by transmitting a bcoi message including its physical signature (for example, orthogonal sequence) through the $k^{th}$ bcoi channel of the $n^{th}$ frame. For transmitting the bcoi message, M (an arbitrary number) orthogonal code may be defined.

Specifically, when the transmitting terminal wants to transmit a message through the $k^{th}$ BCH of the $(n+1)^{th}$ frame, it may select an orthogonal code among M orthogonal codes based on a hash function to which its identifier and the BCH number (k) are inputted, and transmit a bcoi message including information on the selected orthogonal code through the $k^{th}$ bcoi channel of the $n^{th}$ frame. Other terminals can detect at least one orthogonal code from the bcoi message received through the $k^{th}$ bcoi channel, and transmit an echo message including information on the detected orthogonal code to the transmitting terminal through a $k^{th}$ echo channel of the $n^{th}$ frame. If a receiving terminal receives a bcoi message including information on a plurality of orthogonal codes (for example, orthogonal code 1 and orthogonal code 2) through the $k^{th}$ bcoi channel, it may transmit an echo message including information on the plurality of orthogonal codes to the transmitting terminal through the $k^{th}$ echo channel of the $n^{th}$ frame.

The transmitting terminal may receive the echo message through the $k^{th}$ echo channel of the $n^{th}$ frame. If information on a plurality of orthogonal codes are included in the echo message, the transmitting terminal may identify that a plurality of terminals want to occupy the $k^{th}$ BCH of the $(n+1)^{th}$ frame. In this case, when the transmitting terminal identifies that an orthogonal code having a higher priority (for example, a lower code number) than its orthogonal code is included in the echo message, it may give up the $k^{th}$ BCH of the $(n+1)^{th}$ frame. On the contrary, when the transmitting terminal identifies that an orthogonal code having a lower priority (for example, a higher code number) than its orthogonal code is included in the echo message, it can broadcast its message through the $k^{th}$ BCH of the $(n+1)^{th}$ frame. For example, when a transmitting terminal which transmits an orthogonal code 1 through the $k^{th}$ bcoi channel of the $n^{th}$ frame identifies that orthogonal codes 1 and 3 are included in an echo message received through the $k^{th}$ echo channel of the $n^{th}$ frame, it can broadcast its message through the $k^{th}$ BCH of the $(n+1)^{th}$ frame even though a plurality of terminals want to occupy the $k^{th}$ BCH of the $(n+1)^{th}$ frame.

In case that the second broadcast frame is used in the above-described manner, it can be prevented that a plurality of transmitting terminals occupy a same BCH. Thus, a probability of a collision between messages may be decreased.

Figure 30:
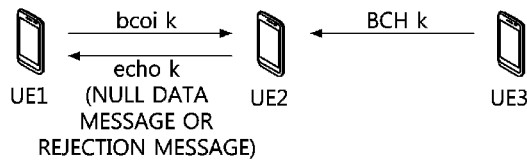
FIG. 30 is a conceptual diagram illustrating a broadcast procedure according to an example embodiment of the present invention.

FIG. 30 is a conceptual diagram illustrating a broadcast procedure according to an example embodiment of the present invention. Here, each terminal may operate based on the second broadcast frame illustrated in FIG. 29.

Referring to FIG. 30, when a first terminal UE1 determines that a $k^{th}$ BCH can be used based on a carrier sensing, etc., it may request other terminals to check an occupation status of the $k^{th}$ BCH through a $k^{th}$ bcoi channel included in a $n^{th}$ frame in order to use the $k^{th}$ BCH from a $(n+1)^{th}$ frame. Meanwhile, a second terminal UE2 which already knows that the $k^{th}$ BCH is being used by a third terminal UE3 may notify the first terminal that the $k^{th}$ BCH is being used by other terminal by transmitting a null data message or a message indicating rejection on a use of the $k^{th}$ BCH through a $k^{th}$ echo channel included in the $n^{th}$ frame.

Figure 31:
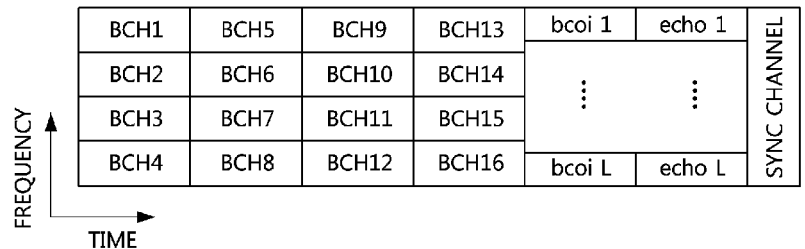
FIG. 31 is a block diagram illustrating a third broadcast frame according to an example embodiment of the present invention.

FIG. 31 is a block diagram illustrating a third broadcast frame according to an example embodiment of the present invention.

Referring to FIG. 31, time-frequency resources of the third broadcast frame may be configured with three parts. That is, the third broadcast frame may comprise BCHs, channels used for checking occupation statuses of the BCHs (bcoi channels and echo channels), and at least one synchronization channel. The number of the bcoi channels corresponds to the number of the echo channels. Also, each of bcoi channels corresponds to each of the echo channels. However, the BCHs do not have one-to-one relations with the bcoi channels (or, echo channels). Here, as many orthogonal codes as the number of the bcoi channels (or, echo channels) are defined. The preamble for automatic gain control illustrated in FIG. 26 and a gap for TX/RX switching may be included also in the third broadcast frame.

When a transmitting terminal wants to transmit a message through a $k^{th}$ BCH included in a $(n+1)^{th}$ frame, it may notify that it will occupy the $k^{th}$ BCH from the $(n+1)^{th}$ frame through a $m^{th}$ bcoi channel included in the $n^{th}$ frame. That is, the transmitting terminal transmits a message including a orthogonal code k. Other terminals can detect at least one orthogonal code in at least one bcoi message received through the $m^{th}$ bcoi channel of the $n^{th}$ frame, and transmit an echo message including information on the at least one detected orthogonal code through a $m^{th}$ echo channel of the $n^{th}$ frame. If a receiving terminal receives a bcoi message including information on a plurality of orthogonal codes, it may transmit an echo message including information on the plurality of orthogonal codes to the transmitting terminal through the $m^{th}$ echo channel of the $n^{th}$ frame.

Meanwhile, when a terminal which is using the $k^{th}$ BCH receives the bcoi message through the $m^{th}$ bcoi channel, it may notify the transmitting terminal that the $k^{th}$ BCH is being used by transmitting a null data message or a message indicating rejection on a use of the $k^{th}$ BCH through a $m^{th}$ echo channel of the $n^{th}$ frame.

The transmitting terminal may receive the echo message through the $m^{th}$ echo channel of the $n^{th}$ frame. If information on a plurality of orthogonal codes are included in the echo message, the transmitting terminal may identify that a plurality of terminals want to occupy the $k^{th}$ BCH of the $(n+1)^{th}$ frame. In this case, when the transmitting terminal identifies that an orthogonal code having a higher priority (for example, a lower code number) than its orthogonal code is included in the echo message, it may give up the $k^{th}$ BCH of the $(n+1)^{th}$ frame. On the contrary, when the transmitting terminal identifies that an orthogonal code having a lower priority (for example, a higher code number) than its orthogonal code is included in the echo message, it can broadcast its message through the $k^{th}$ BCH of the $(n+1)^{th}$ frame.

Figure 32:
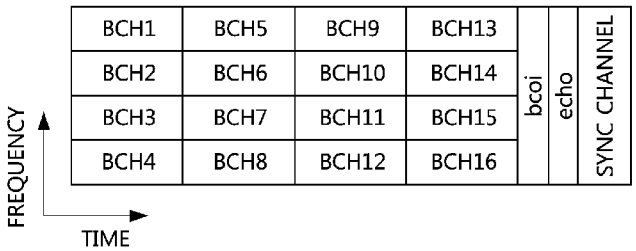
FIG. 32 is a block diagram illustrating a fourth broadcast frame according to an example embodiment of the present invention.

FIG. 32 is a block diagram illustrating a fourth broadcast frame according to an example embodiment of the present invention.

Referring to FIG. 32, time-frequency resources of the fourth broadcast frame may be configured with three parts. That is, the fourth broadcast frame may comprise BCHs, channels used for checking occupation statuses of the BCHs (a bcoi channel and an echo channel), and at least one synchronization channel. The fourth broadcast frame may comprise a single bcoi channel and a single echo channel. Here, the number of orthogonal code may be defined as an integer multiple of the number of BCHs (for example, L times). That is, each of BCHs may correspond to L orthogonal codes. The preamble for automatic gain control illustrated in FIG. 26 and a gap for TX/RX switching may be included also in the fourth broadcast frame.

When a transmitting terminal wants to transmit a message through the $k^{th}$ BCH of the $(n+1)^{th}$ frame, it may select an orthogonal code among L orthogonal codes corresponding to the $k^{th}$ BCH, and transmit a bcoi message including information on the selected orthogonal code through the bcoi channel of the $n^{th}$ frame. Other terminals can detect at least one orthogonal code from the bcoi message received through the bcoi channel, and transmit an echo message including information on the at least one detected orthogonal code to the transmitting terminal through the echo channel of the $n^{th}$ frame.

The transmitting terminal may receive the echo message through the echo channel of the $n^{th}$ frame. If information on a plurality of orthogonal codes are included in the echo message, the transmitting terminal may identify that a plurality of terminals want to occupy the $k^{th}$ BCH of the $(n+1)^{th}$ frame.

For example, it is assumed that an orthogonal code set corresponding to the $k^{th}$ BCH is $\{C_{k1}, C_{k2}, \ldots, C_{kL}\}$. Also, the transmitting terminal is assumed to transmit the bcoi message including the orthogonal code $C_{ki}$ through the bcoi channel of the $n^{th}$ frame, and receive the echo message including information on orthogonal codes $C_{ki}$ and $C_{kj}$. In this case, if $C_{ki} < C_{kj}$, the transmitting terminal can broadcast its message through the $k^{th}$ BCH of the $(n+1)^{th}$ frame. On the contrary, if $C_{ki} >= C_{kj}$, the transmitting terminal may give up the $k^{th}$ BCH of the $(n+1)^{th}$ frame.

Figure 33:
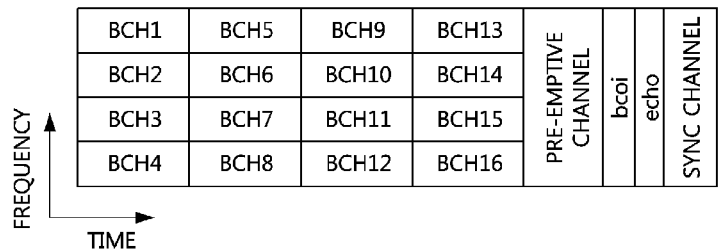
FIG. 33 is a block diagram illustrating a fifth broadcast frame according to an example embodiment of the present invention.

FIG. 33 is a block diagram illustrating a fifth broadcast frame according to an example embodiment of the present invention.

Referring to FIG. 33, time-frequency resources of the fifth broadcast frame may comprise four parts. That is, the fifth broadcast frame may comprise BCHs, an pre-emptive channel for processing an emergent communication request, channels used for checking occupation statuses of the BCHs (a bcoi channel and an echo channel), and at least one synchronization channel. The fifth broadcast frame may comprise a single pre-emptive channel, a single bcoi channel, and a single echo channel. The preamble for automatic gain control illustrated in FIG. 26 and a gap for TX/RX switching may be included also in the fifth broadcast frame.

When an emergency communication request occurs in case that all channels are occupied, an emergency terminal may transmit a pre-emptive message including an orthogonal code k through the pre-emptive channel of a $n^{th}$ frame in order to preferentially occupy a $k^{th}$ BCH of a $(n+1)^{th}$ frame. If other terminals receive the pre-emptive message through the pre-emptive channel of the $n^{th}$ frame, they may detect the orthogonal code k in the received pre-emptive message. Then, they may not use the $k^{th}$ BCH from the $(n+1)^{th}$ frame.

While the example embodiments of the present invention and their advantages have been described in detail, it should be understood that various changes, substitutions and alterations may be made herein without departing from the scope of the invention.

What is claimed is:

1. A public safety communication method performed in a transmitting node supporting groupcast or broadcast, the method comprising:
   a frame used in the method includes a plurality of data channels, a plurality of ACK channels corresponding the plurality of data channels, a plurality of L-REQ channels corresponding the plurality of data channels, and a plurality of L-RLY channels corresponding the plurality of data channels,
   transmitting a $k^{th}$ L-REQ channel including a groupcast or a broadcast identifier (ID) to support groupcast or broadcast link setup, wherein k is a natural number; and
   receiving a null message from a receiving node through a L-RLY channel corresponding the $k^{th}$ L-REQ channel if the groupcast or broadcast link setup is allowed, or a predefined sequence message from the receiving node through the L-RLY channel corresponding the $k^{th}$ L-REQ channel if the groupcast or broadcast link setup is not allowed.

2. The method of claim 1, further comprising:
performing the groupcast from a next frame if the null message is received from the receiving node, or re-performing the groupcast link setup in the next frame if the predefined sequence message is received from the receiving node.

3. The method of claim 1, wherein when the groupcast is performed by setting the groupcast link, a predefined signal to protect the groupcast link is transmitted from the receiving node through an ACK channel.

4. A priority call process method comprising:
a frame used in the method includes a plurality of data channels, a plurality of ACK channels corresponding the plurality of data channels, a plurality of L-REQ channels corresponding the plurality of data channels, and a plurality of L-RLY channels corresponding the plurality of data channels,
requesting, by a node having a priority call to be transmitted, priority call link setup using a specified data channel through a L-REQ channel in a $n^{th}$ frame, wherein n is a natural number;
transmitting, by a node having usage right of the specified data channel, information indicating transmission suspension through the specified data channel in a $(n+1)^{th}$ frame; and
transmitting, by a node receiving the information indicating transmission suspension, information indicating that the transmission suspension is recognized through an ACK channel corresponding the specified data channel.

5. A priority call process method comprising:
a frame used in the method includes a plurality of data channels, a plurality of ACK channels corresponding the plurality of data channels, a plurality of L-REQ channels corresponding the plurality of data channels, and a plurality of L-RLY channels corresponding the plurality of data channels,
requesting, by a node having a priority call to be transmitted, priority call link setup using a specified data channel through a L-REQ channel in a $n^{th}$ frame, wherein n is a nature number;
requesting, by a node receiving the specified data channel, usage suspension of the specified data channel through a ACK channel corresponding the specified data channel in a $(n+1)^{th}$ frame; and
suspending, by a node having a usage right of the specified data channel, usage of the specified data channel from a $(n+2)^{th}$ frame if request of usage suspension of the specified data channel is allowed.

6. A public safety communication method performed in a transmitting node, the method comprising:
a frame used in the method includes a plurality of broadcast channels (BCH), a plurality of BCH occupancy indication (bcoi) channels and a plurality of echo channels which are used for confirming occupancy status of the BCH,
transmitting a predefined orthogonal code through a bcoi channel in a $n^{th}$ frame to notifying that a BCH in a $(n+1)^{th}$ frame is occupied by the transmitting node, wherein n is a nature number;
receiving, by the transmitting node, information including at least one orthogonal code through an echo channel in the $n^{th}$ frame, wherein the information including at least one orthogonal code, transmitted through a bcoi channel in $n^{th}$ frame, is obtained by a receiving node; and
transmitting a data through a BCH in the $(n+1)^{th}$ frame if the predefined orthogonal code transmitted from the transmitting node is only included in the information including at least one orthogonal code, or a data through a BCH in the $(n+1)^{th}$ frame if the predefined orthogonal code transmitted from the transmitting node is conformed to a predefined condition when the information including at least one orthogonal code includes a plurality of orthogonal code.

* * * * *